(12) United States Patent
Levien et al.

(10) Patent No.: US 8,237,801 B2
(45) Date of Patent: Aug. 7, 2012

(54) IMAGE PROCESSING SYSTEM AND COMMUNICATION METHOD

(75) Inventors: Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Innovation Science Fund I, LLC, Bellevue, WA (US)

( * ) Notice: Subject to any disclaimer, the term of this patent is extended or adjusted under 35 U.S.C. 154(b) by 1493 days.

(21) Appl. No.: 11/198,879

(22) Filed: Aug. 5, 2005

(65) Prior Publication Data
US 2007/0030357 A1 Feb. 8, 2007

(51) Int. Cl.
H04N 5/225 (2006.01)
H04N 5/232 (2006.01)
H04N 7/14 (2006.01)
H04N 5/76 (2006.01)
H04N 7/173 (2011.01)

(52) U.S. Cl. ............... 348/207.1; 348/211.1; 348/14.02; 348/231.2; 725/105

(58) Field of Classification Search ............... 348/211.1, 348/211.2, 211.5, 211.6, 333.02, 14.02, 14.03, 348/14.14, 207.1, 211.3, 211.14, 231.2, 231.3, 348/231.6; 725/105, 112
See application file for complete search history.

(56) References Cited

U.S. PATENT DOCUMENTS

| | | | |
|---|---|---|---|
| 5,528,293 A | | 6/1996 | Watanabe |
| 5,615,015 A | * | 3/1997 | Krist et al. ..................... 358/296 |
| 5,629,778 A | * | 5/1997 | Reuman ........................ 382/252 |
| 5,825,506 A | * | 10/1998 | Bednar et al. .................. 358/402 |
| 5,917,542 A | * | 6/1999 | Moghadam et al. ...... 348/231.99 |
| 6,078,756 A | * | 6/2000 | Squilla et al. .................. 396/300 |
| 6,167,469 A | * | 12/2000 | Safai et al. ................. 348/211.3 |
| 6,535,243 B1 | * | 3/2003 | Tullis .......................... 348/207.1 |
| 6,573,931 B1 | * | 6/2003 | Horii et al. ............... 348/211.14 |
| 6,614,408 B1 | * | 9/2003 | Mann ................................. 345/8 |
| 6,657,658 B2 | * | 12/2003 | Takemura ................ 348/333.02 |
| 7,117,519 B1 | * | 10/2006 | Anderson et al. ........ 348/333.02 |
| 7,210,161 B2 | * | 4/2007 | Ward et al. ..................... 725/105 |
| 7,468,744 B2 | * | 12/2008 | Edwards et al. ........... 348/211.6 |
| 7,535,492 B2 | * | 5/2009 | Kahn et al. .................. 348/211.1 |
| 2001/0029521 A1 | * | 10/2001 | Matsuda et al. .............. 709/201 |
| 2002/0051074 A1 | * | 5/2002 | Kawaoka et al. ............. 348/376 |
| 2002/0067500 A1 | * | 6/2002 | Yokomizo et al. ........... 358/1.15 |
| 2002/0181012 A1 | * | 12/2002 | Miller et al. .................. 358/1.15 |
| 2002/0191082 A1 | * | 12/2002 | Fujino et al. ............. 348/211.14 |

(Continued)

FOREIGN PATENT DOCUMENTS

JP 11-313279 * 11/1999

OTHER PUBLICATIONS

Young, Darrell; "JPEG, TIFF or RAW . . . Which should I use, Nikonians Guide"; pp. 1-5; located at http://www.nikonians.org/html/resources/guides/digital/jpeg_tiff_or_raw_1.html; printed Jul. 16, 2005.

*Primary Examiner* — Nhan T Tran

(57) ABSTRACT

An apparatus, device, methods, computer program product, and system are described that determine a processing to be performed on an image at a remote processing resource, capture an image, and transmit to the remote processing resource, in response to a triggering event, the image to be processed and associated information.

24 Claims, 29 Drawing Sheets

U.S. PATENT DOCUMENTS

| | | | |
|---|---|---|---|
| 2002/0195189 A1* | 12/2002 | Allen et al. | 156/217 |
| 2004/0196374 A1* | 10/2004 | Billerbeck | 348/207.1 |
| 2004/0201702 A1* | 10/2004 | White | 348/207.99 |
| 2005/0075895 A1* | 4/2005 | Mohsenin et al. | 705/1 |
| 2005/0198063 A1* | 9/2005 | Thomas et al. | 707/102 |
| 2006/0274357 A1* | 12/2006 | Shen | 358/1.15 |
| 2007/0064112 A1* | 3/2007 | Chatting et al. | 348/207.99 |

* cited by examiner

2404 Device (e.g., an image capture device, a camera, or an image capture device with wireless communications capability)

2402 Computing device 2410 computer-executable instructions operable to:
determine a processing to be performed on an image at a remote processing resource; capture an image; and
transmit to the remote processing resource, in response to a triggering event, the image to be processed and associated information.

2412 computer-executable instructions operable to:
receive status information indicating a status of the processing of the image 2414 computer-executable instructions operable to:
receive the image after it has been processed at the remote processing resource

FIG. 28

2800 A computer program product.

2802 A signal bearing medium.

2804 at least one of
one or more instructions for receiving via a wireless link an image and associated information from a user;
one or more instructions for processing the image according to the associated information;
one or more instructions for communicating an image processing status to the user according to the associated information; and
one or more instructions for providing or communicating the processed image according to the associated information.

2806 a computer-readable medium 2808 a recordable medium 2810 a communications medium

IMAGE PROCESSING SYSTEM AND COMMUNICATION METHOD

SUMMARY

An embodiment provides a method. In one implementation, the method includes but is not limited to determining a processing to be performed on an image at a remote processing resource, capturing an image, and transmitting to the remote processing resource, in response to a triggering event, the image to be processed and associated information. In addition to the foregoing, other method aspects are described in the claims, drawings, and text forming a part of the present disclosure.

An embodiment provides a computer program product. In one implementation, the computer program product includes but is not limited to a signal bearing medium bearing at least one of one or more instructions for determining a processing to be performed on an image at a remote processing resource, one or more instructions for capturing an image, and one or more instructions for transmitting to the remote processing resource, in response to a triggering event, the image to be processed and associated information. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to determine a processing to be performed on an image at a remote processing resource, capture an image, and transmit to the remote processing resource, in response to a triggering event, the image to be processed and associated information. In addition to the foregoing, other system aspects are described in the claims, drawings, and text forming a part of the present disclosure.

An embodiment provides a device. In one implementation, the device includes but is not limited to a processing system, the processing system comprising determining logic that is operable to determine a processing to be performed on an image at a remote processing resource, capturing logic that is operable to capture an image, and transmitting logic that is operable to transmit to the remote processing resource, in response to a triggering event, the image to be processed and associated information. In addition to the foregoing, other device aspects are described in the claims, drawings, and text forming a part of the present disclosure.

An embodiment provides another method. In one implementation, the method includes but is not limited to receiving via a wireless link an image and associated information from a user, processing the image according to the associated information, communicating an image processing status to the user according to the associated information, and providing or communicating the processed image according to the associated information. In addition to the foregoing, other method aspects are described in the claims, drawings, and text forming a part of the present disclosure.

An embodiment provides a computer program product. In one implementation, the computer program product includes but is not limited to a signal bearing medium bearing at least one of one or more instructions for receiving via a wireless link an image and associated information from a user, one or more instructions for processing the image according to the associated information, one or more instructions for communicating an image processing status to the user according to the associated information, and one or more instructions for providing or communicating the processed image according to the associated information. In addition to the foregoing, other computer program product aspects are described in the claims, drawings, and text forming a part of the present disclosure. In addition to the foregoing, various other embodiments are set forth and described in the text (e.g., claims and/or detailed description) and/or drawings of the present description.

An embodiment provides another method. In one implementation, the method includes but is not limited to selecting a processing mode for an image, adjusting one or more parameters of an image capture device based on the selected processing mode, capturing an image using the image capture device according to the adjusted parameters, and providing to a remote processing resource the image to be processed and an identification of the selected processing mode, the selected processing mode associated with one or more image processing steps. In addition to the foregoing, other method aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

The foregoing is a summary and thus contains, by necessity, simplifications, generalizations and omissions of detail; consequently, those skilled in the art will appreciate that the summary is illustrative only and is not intended to be in any way limiting. Other aspects, features, and advantages of the devices and/or processes described herein, as defined by the claims, will become apparent in the detailed description set forth herein.

BRIEF DESCRIPTION OF THE DRAWINGS

FIG. 24 illustrates an exemplary system 2400 in which embodiments may be implemented.

FIG. 28 illustrates a partial view of an exemplary computer program product 2800.

The use of the same symbols in different drawings typically indicates similar or identical items.

DETAILED DESCRIPTION

Figure 1:
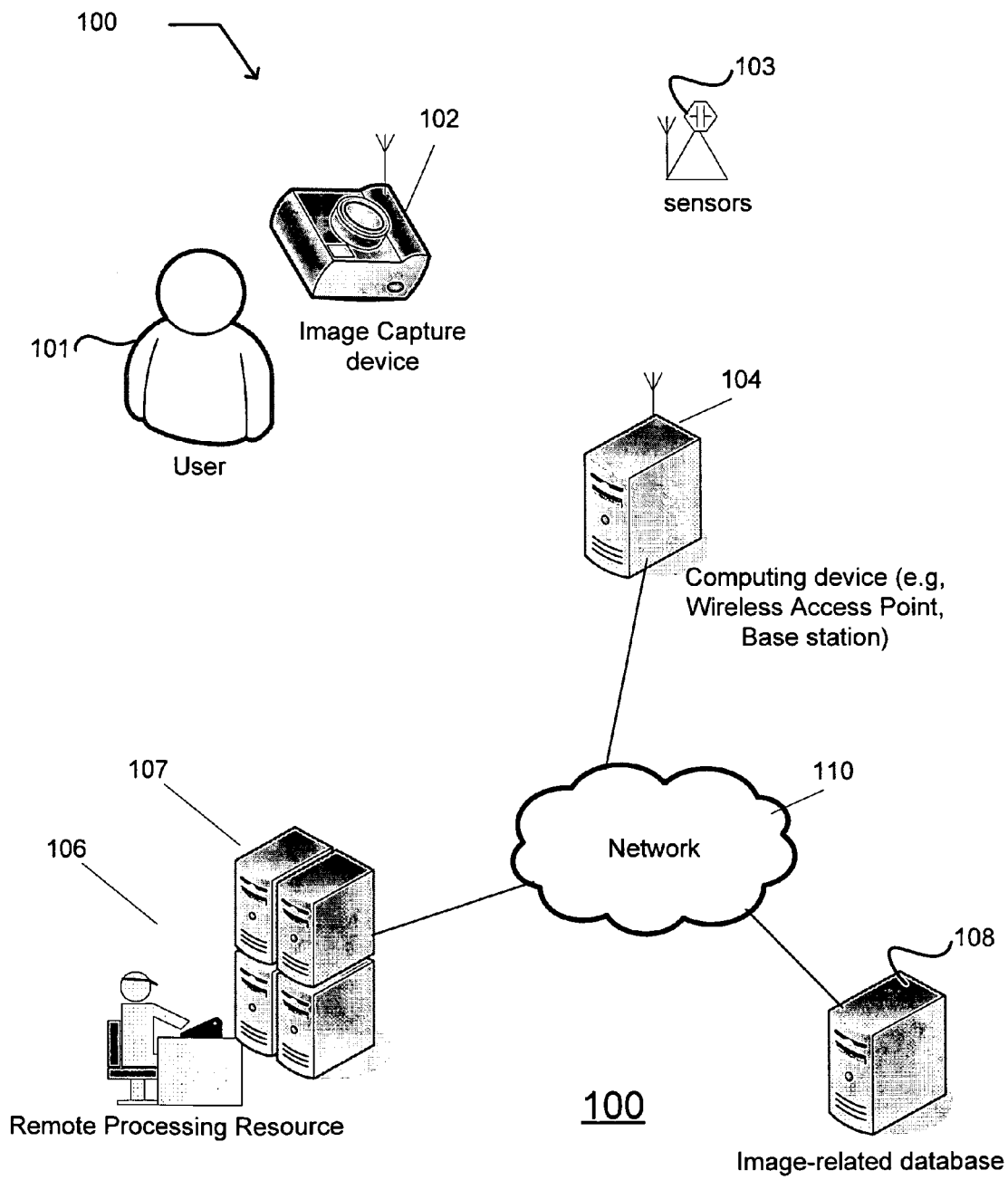
FIG. 1 illustrates an example system in which embodiments may be implemented.

FIG. 1 illustrates an example system 100 in which embodiments may be implemented, perhaps in the context of a device. In FIG. 1, a user 101 may operate an image capture device 102 to capture an image or picture of an object (not shown). Image capture device 102 may be any device capable of capturing an image, such as, for example, a camera, a digital camera, a wireless device, phone, cellular phone, personal digital assistant (PDA), etc.

Image capture device 102 may be a high quality or high resolution image capture device, or device 102 may be a lower quality image capture device, such as the image capture devices found in mobile or cellular phones, PDAs, etc., although the subject matter described herein is not limited thereto. The image capture device 102 may be relatively large or very small. Image capture device 102 may be expensive or very inexpensive. The image capture device 102 may include (on-board) very complex circuitry and image processing logic, or it may be a relatively simple device that merely provides, for example, some basic optical and electrical components to capture an image on a sensor without including additional image processing or other logic, for example, etc. The image capture device 102 may be a wide variety of devices and these devices described above are merely provided as examples, and the subject matter described herein is not limited thereto.

In FIG. 1, one or more sensors 103 may be provided to provide image-related sensor data. Sensors 103 may sense and provide image-related data such as lighting conditions, etc. This data may be helpful in generating, processing, or enhancing images. A computing device 104 may be provided, and may be any computing device, which may be any device that performs computing or processing in some manner, such as a computer, a processor, a controller, a logic device, a PC, a router, a server, switch, a PDA or cellular phone, mobile device, a wireless access point (AP) or base station, and other similar devices, and may include hardware, software or a combination of hardware and software. An image-related database 108 (e.g., provided on a computing device) may store and provide images and image-related information.

Also in FIG. 1, a remote processing resource 106 may be provided to process images, and may include, for example one or more computing devices 107 and may include a person to perform or facilitate the processing of received images. According to an example embodiment, remote processing resource 106 may include image processing software and one or more relatively powerful computing devices to allow more powerful and flexible image processing to be performed as compared to the more limited image processing that may be performed by cameras or image captured devices themselves. The processing of images at remote processing resource 106 may be automatic (e.g., processed by a computing device automatically), manual, a combination of both manual and automatic processing, for example. Remote processing resource 106 may be considered remote in that the remote processing resource 106 may be located anywhere, and is typically physically separate from the image capture device 102, according to an example embodiment. Remote processing resource 106, computing device 104 and database 108 may be coupled to a network 110, which may be any type of network.

Referring to FIG. 1, a user may capture an image using image capture device 102. Sensor data may also be obtained by sensors 103 relating to the captured image. The image may be captured and stored (at least temporarily) in image capture device 102 in any format (compressed, uncompressed, processed, unprocessed or raw, etc.). The captured image may, for example, be wirelessly transmitted by image capture device 102 to computing device 104 and then forwarded to remote processing resource 106 via network 110, for example. Remote computing resource 106 may perform image processing on the received image. A variety of different types of image processing may be performed on the image by remote processing resource 106. According to an example embodiment, remote processing resource 106 may obtain image-related information such as sensor data (e.g., from sensors 103) and/or other images (e.g., from database 108) and may process the received image using this information and other information.

The processed image may then be returned to the image capture device 102, e.g., via network 110, computing device 104 and a wireless link to the image capture device 102 where it may be viewed or displayed by the user. Or the processed image may be stored on a storage resource, such as a server or database, where the user or device 102 may retrieve the processed image. For example, one or more images may be captured by device 102 and immediately transmitted to remote processing resource 106 for processing. The processed images may be returned to image capture device (or other user device) to allow the user to display the processed images. In this manner, a user may use a wide variety of image capture devices to capture an image, and one or more aspects of image processing may be offloaded to the remote processing resource where more powerful image processing tools are typically available. The processed image may be returned to the user or user device or made available to the user. In this manner, according to an example embodiment, the user may obtain the benefits associated with a very expensive or high quality camera (e.g., obtain higher quality images) while using a smaller, less expensive or simpler image capture device due to offloading of one or more aspects of the image processing to the remote processing resource.

Figure 2:
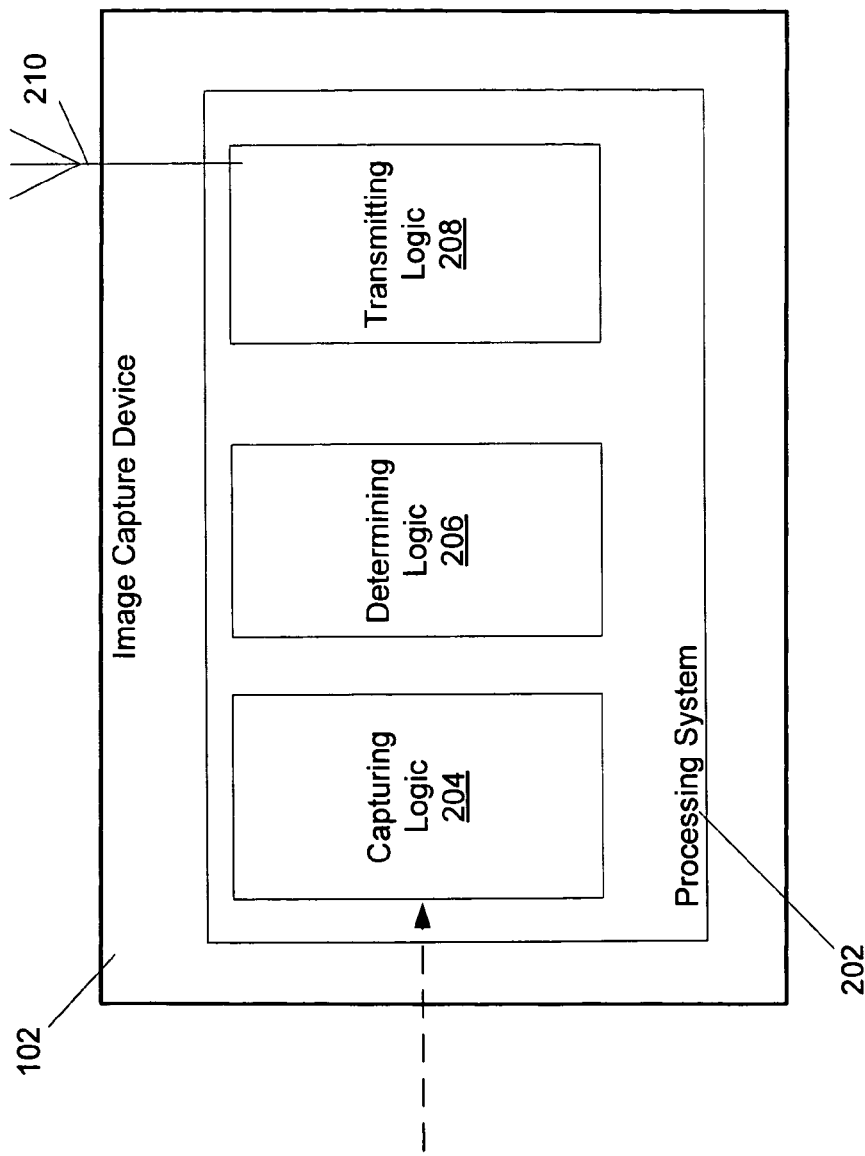
FIG. 2 is a block diagram illustrating an image capture device according to an example embodiment.

FIG. 2 is a block diagram illustrating an image capture device according to an example embodiment. Image capture device 102 may include a processing system 202, which may include hardware, logic, circuitry, software, firmware, or any combination thereof. In an example embodiment, image capture device 102 may include capturing logic 204 to capture an image. Capturing logic 204 may include, for example, one or more sensors such as CMOS devices or CCD (charge coupled devices) to capture an image), an analog-to-digital converter to convert the image from analog to digital signals, and a memory for (at least temporarily) storing the captured digital image. Image capture device 102 may also include a determining logic 206, for example, to determine a processing to be performed on an image, to determine a remote processing resource to receive the image for processing, etc. Determining logic 206 may be implemented, for example, using logic, circuitry, and/or a programmed processor or controller, etc. Image capture device 102 may also include a transmitting logic 208 to transmit the image to the remote processing resource for processing. Transmitting logic 208 may include for example, a network interface card (or controller) such as a wireless network interface, an Ethernet interface, or other transmitting logic.

In FIG. 1, FIG. 2, and/or other like-described figures herein, it should be understood that any and/or all of the illustrated elements, and other elements, not illustrated, may be in communication with one another according to any known methods, including but not limited to the various communication techniques discussed herein.

In an example embodiment, a user may be a human user, such as a person or group of people. Those skilled in the art will appreciate that a user may also include an electronic user or robotic user, such as an electronic device or a user's device, or an electronic device in use by a person, although the subject matter described herein is not limited thereto. A user may include a computing device, such as a cell phone, a PDA, a laptop computer, or other wireless device, as examples, although the subject matter described herein is not limited thereto. Those skilled in the art will appreciate that, in general, the same may be said of "sender," "receiver," "transmitter," and/or other entity-oriented terms as such terms are used herein.

Figure 3:
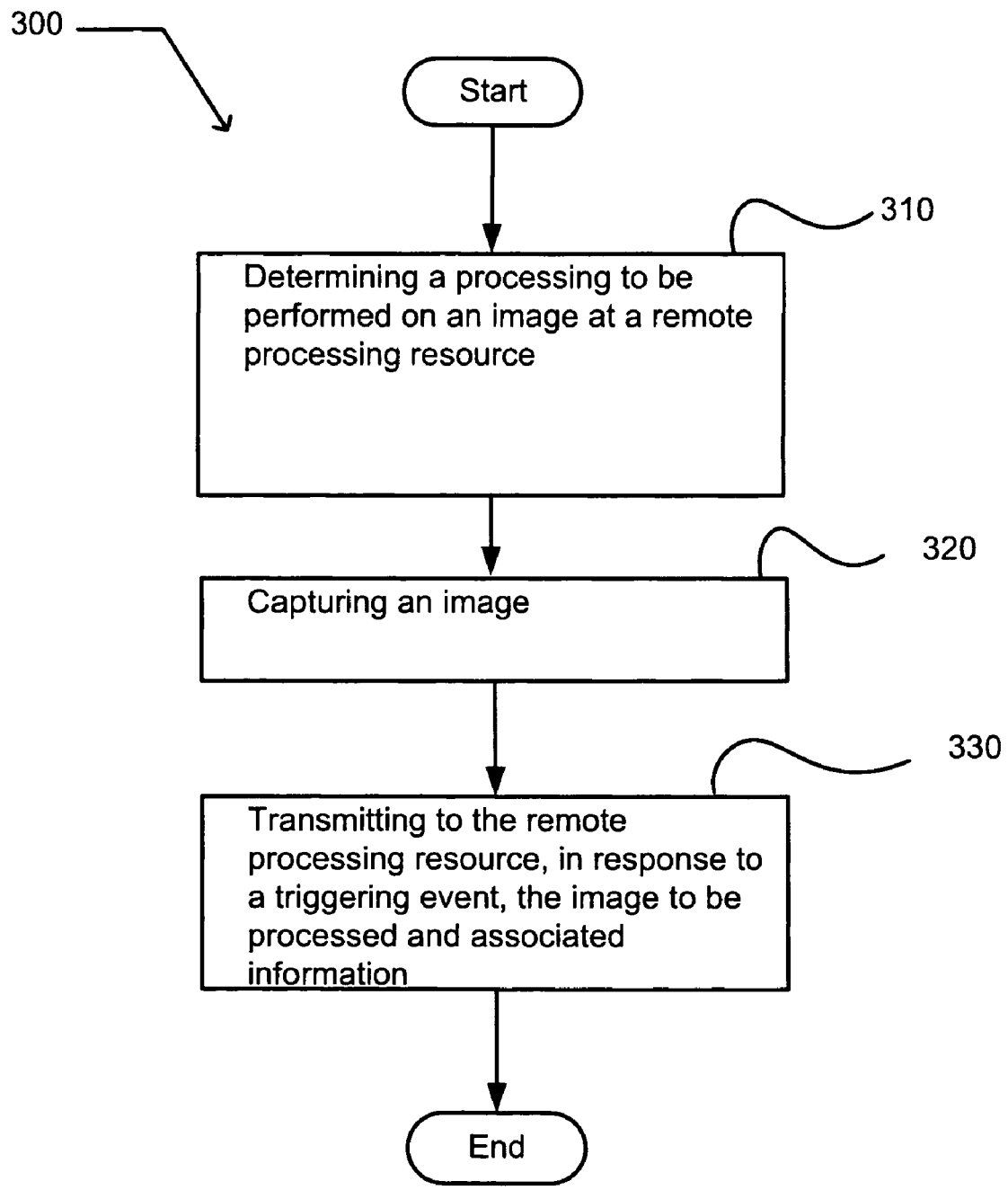
FIG. 3 illustrates an operational flow 300 representing example operations to capture and transmit an image for processing.

In FIG. 3 and in following figures that include various examples of operational flows, discussion and explanation may be provided with respect to the above-described examples of FIGS. 1 and 2 and/or with respect to other examples and contexts. However, it should be understood that the operational flows may be executed in a number of other environment and contexts, and/or in modified versions of FIGS. 1 and 2. Also, although the various operational flows are presented in the sequence(s) illustrated, it should be understood that the various operations may be performed in other orders than those which are illustrated, or may be performed concurrently.

FIG. 3 illustrates an operational flow 300 representing example operations to capture and transmit an image for processing. After a start operation, the operational flow 300 moves to a determining operation 310 where a processing is determined to be performed on an image at a remote processing resource. For example, determining logic, in response to a user request, may determine that a focus in an image should be modified or improved. At a capturing operation 320, an image is captured. For example, capturing logic 204 of image capture device 102 may capture an image. At a transmitting operation 330, an image to be processed and associated information are transmitted to a remote processing resource in response to a triggering event. The triggering event may, for example, be a request by a user (e.g., making a selection to "transmit image for processing"). The associated information may be any of a wide variety of information, such as an indication of the processing to be performed on the image, user ID information identifying a user, an address or identifier associated with the user or the transmitting device to allow the processed image to be returned, etc.

With reference to FIG. 3, in an example embodiment, it is not necessary to transmit with the image an indication of the processing to be performed on the image since, for example, the operation of transmitting the image to a specific remote processing resource may operate to identify the requested processing on the image, or the user may specify in advance (or in other communications) to the remote processing resource the processing to be performed on the image(s), or the type of image transmitted may indicate the type of processing to be performed, etc.

Figure 4:
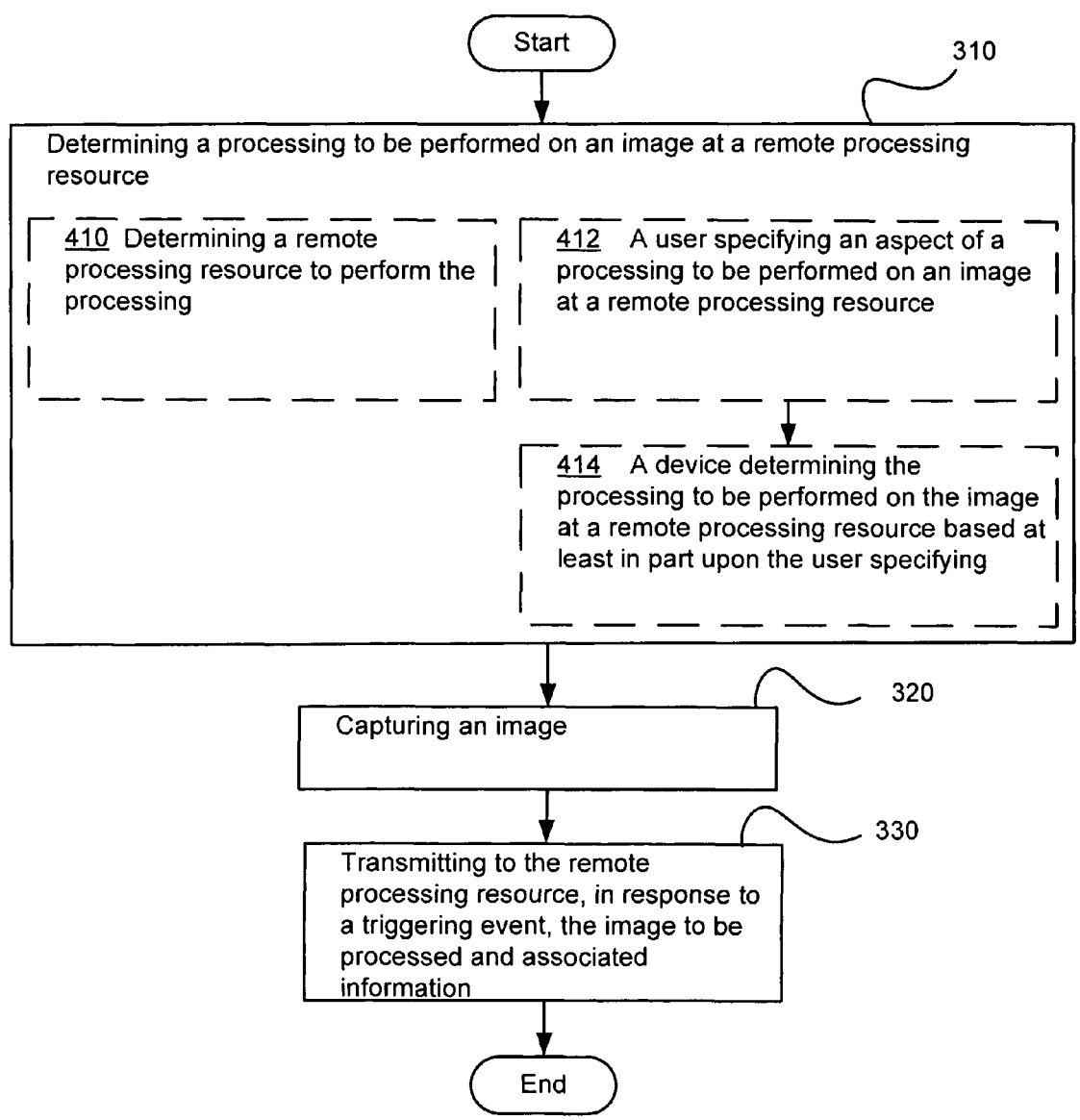
FIG. 4 illustrates an alternative embodiment of the example operational flow 300 of FIG. 3.

FIG. 4 illustrates an alternative embodiment of the example operational flow 300 of FIG. 3. FIG. 4 illustrates an example embodiment where the determining operation 310 may include at least one additional operation. Additional operations may include operation 410, operation 412, and operation 414. At the operation 410, a remote processing resource to perform the processing is determined. For example, there may be a plurality of remote processing resources available to process the captured image. The remote processing resource may be determined, for example, based on a user selection, based on previous selection or programming, through a matching of processing to a remote processing resource that is capable of performing the processing, etc.

At the operation 412, a user specifies an aspect of a processing to be performed on an image at a remote processing resource. For example, a user may specify a processing program (or mode) for processing the image. The user may instead, for example, specify one or more processing instructions, specify a processing result or goal, or may provide information in response to a query from a device or image capture device. For example, after specifying a "portrait" processing program or mode to be used for remote processing of an image, a device (e.g., image capture device or other device) may ask for additional information, such as by indicating that there are three remote processing resources that can provide "portrait" processing, indicating price or processing time for each remote processing center for "portrait" processing. The use may then select one of the remote processing centers, although this is merely one example in which the user may specify an aspect of processing to be performed. Also, for example, the user specifying (operation 412) may be performed either before or after the capturing the image (operation 310).

At the operation 414, a device determines the processing to be performed on an image at a remote processing resource based at least in part upon the user specifying. In an example embodiment, the determining (operation 310) may be performed on a same or different device that performs the capturing (operation 320). For example, the determining (operation 310) may be performed by a PDA, while the capturing may be performed by a small image capture device, which may be, for example, different than the PDA. This is an example and the subject matter described herein is not limited thereto.

Figure 5:
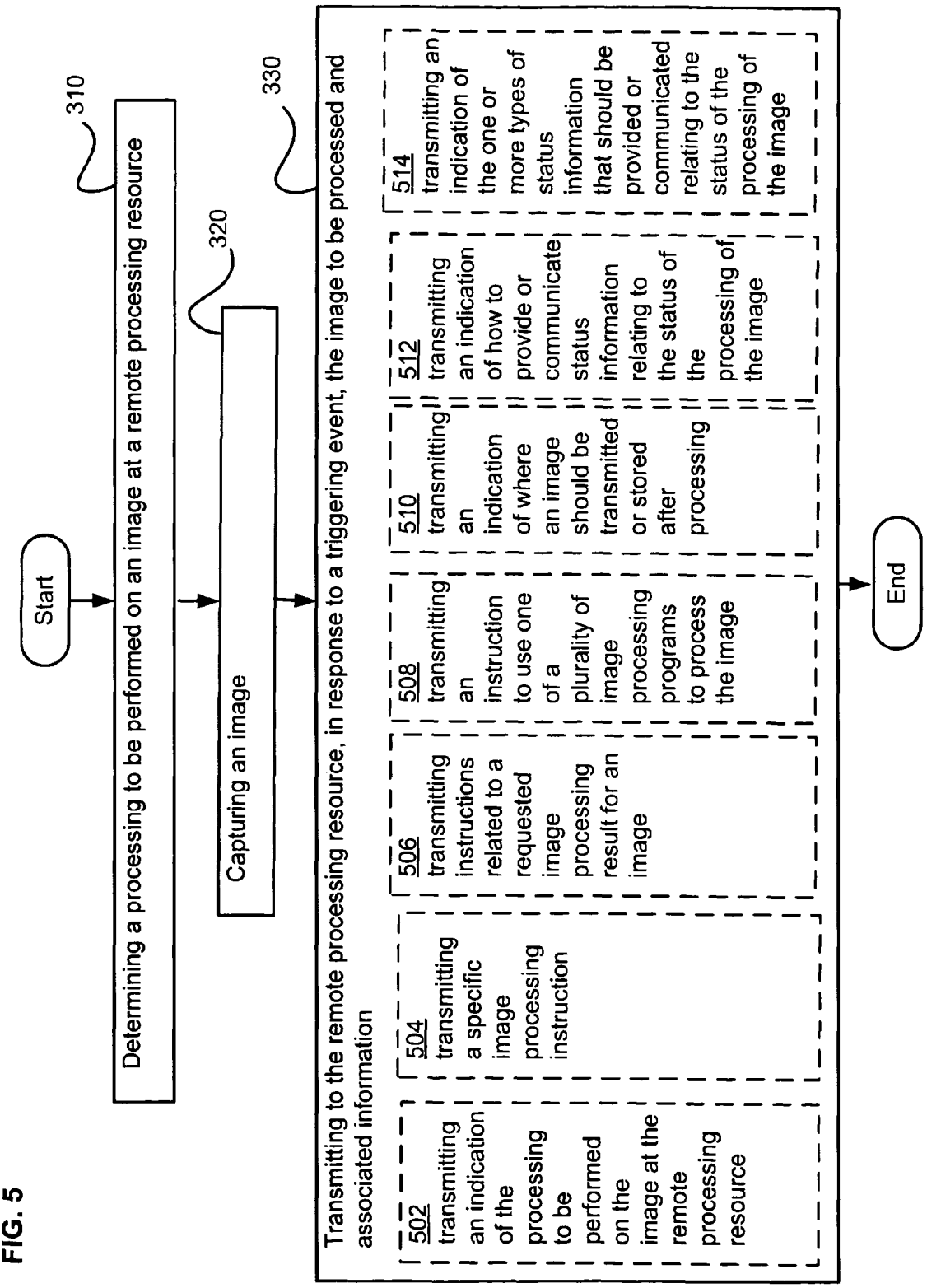
FIG. 5 illustrates an alternative embodiment of the example operational flow 300 of FIG. 3.

FIG. 5 illustrates an alternative embodiment of the example operational flow 300 of FIG. 3. FIG. 5 illustrates an example embodiment where the transmitting operation 330 may include at least one additional operation. Additional operations may include operation 502, operation 504, operation 506, operation 508, operation 510, operation 512, and operation 514. In an example embodiment, one or more of these operations may reflect the associated information that is transmitted with the image.

At the operation 502, an indication of the processing to be performed on the image at the remote processing resource is transmitted. For example, an indication to modify the white balance in an image may be transmitted. At operation 504, a specific image processing instruction is transmitted, such as an instruction to blow up the image 10%. At operation 506, instructions are transmitted related to a requested image processing result for an image. For example, an instruction may be transmitted to "improve focus" or "improve clarity" or "improve white balance" of an image.

At operation 508, an instruction is transmitted to use one of a plurality of image processing modes or programs to process the image. There may be a plurality of pre-defined image processing programs or modes, such as "portrait," "action," etc. Each of these programs or modes may have a set of processing steps or parameters. According to an example embodiment therefore, a user may specify one of a plurality of processing modes or programs, and then the remote processing resource will perform the known or predetermined set of processing steps to process the image for this processing mode or processing program. These image processing modes or programs are described in greater detail, for example, with reference to FIG. 6 below.

Figure 7:
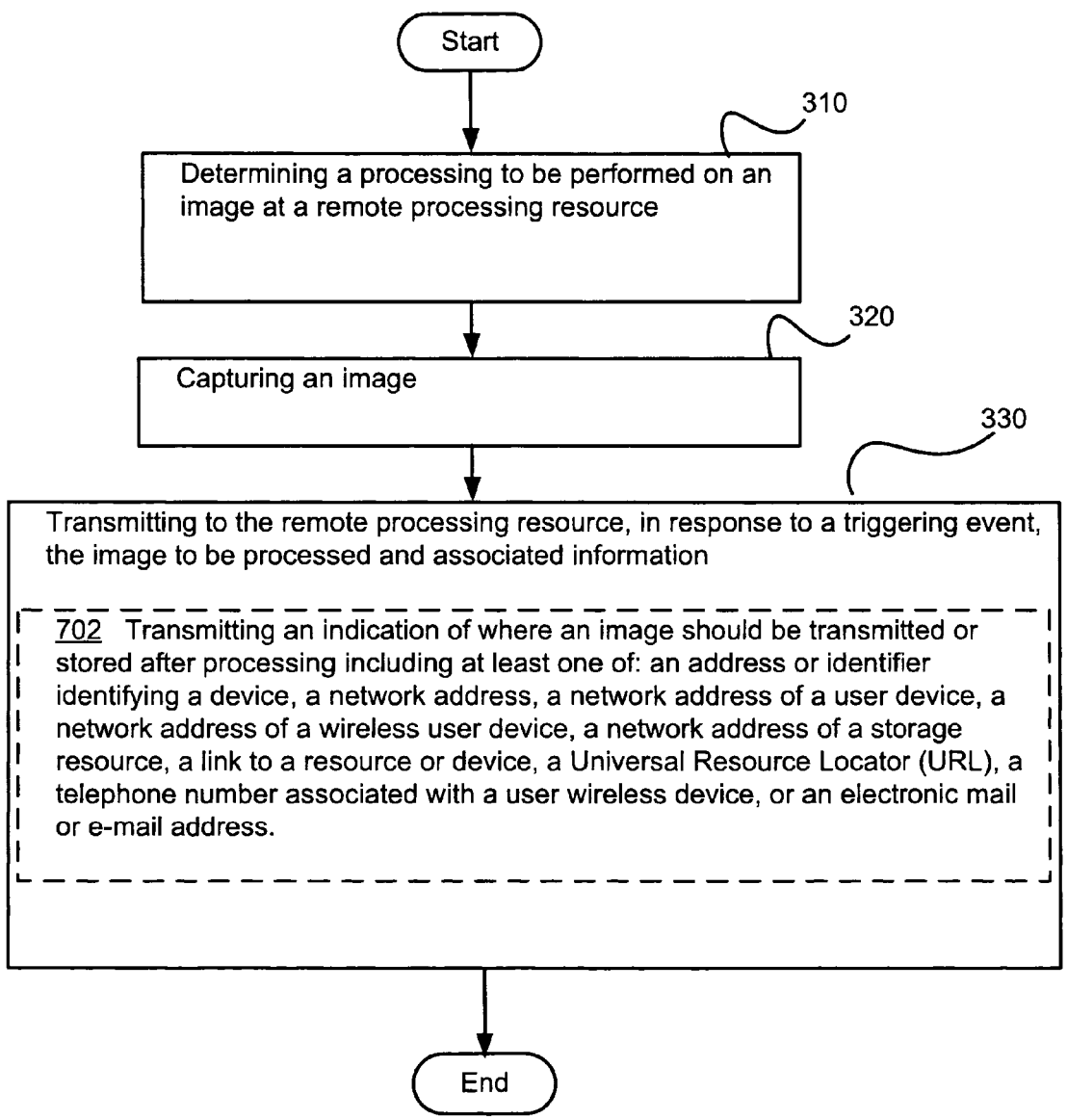
FIG. 7 illustrates another alternative embodiment of the example operational flow 300 of FIG. 3.

At operation 510, an indication of where an image should be transmitted or stored after processing is transmitted, and is described in greater detail, for example, with reference to FIG. 7. For example, a network address of a storage resource where the processed image should be stored may be transmitted to the remote processing resource to allow the user to retrieve the processed image.

Figure 8:
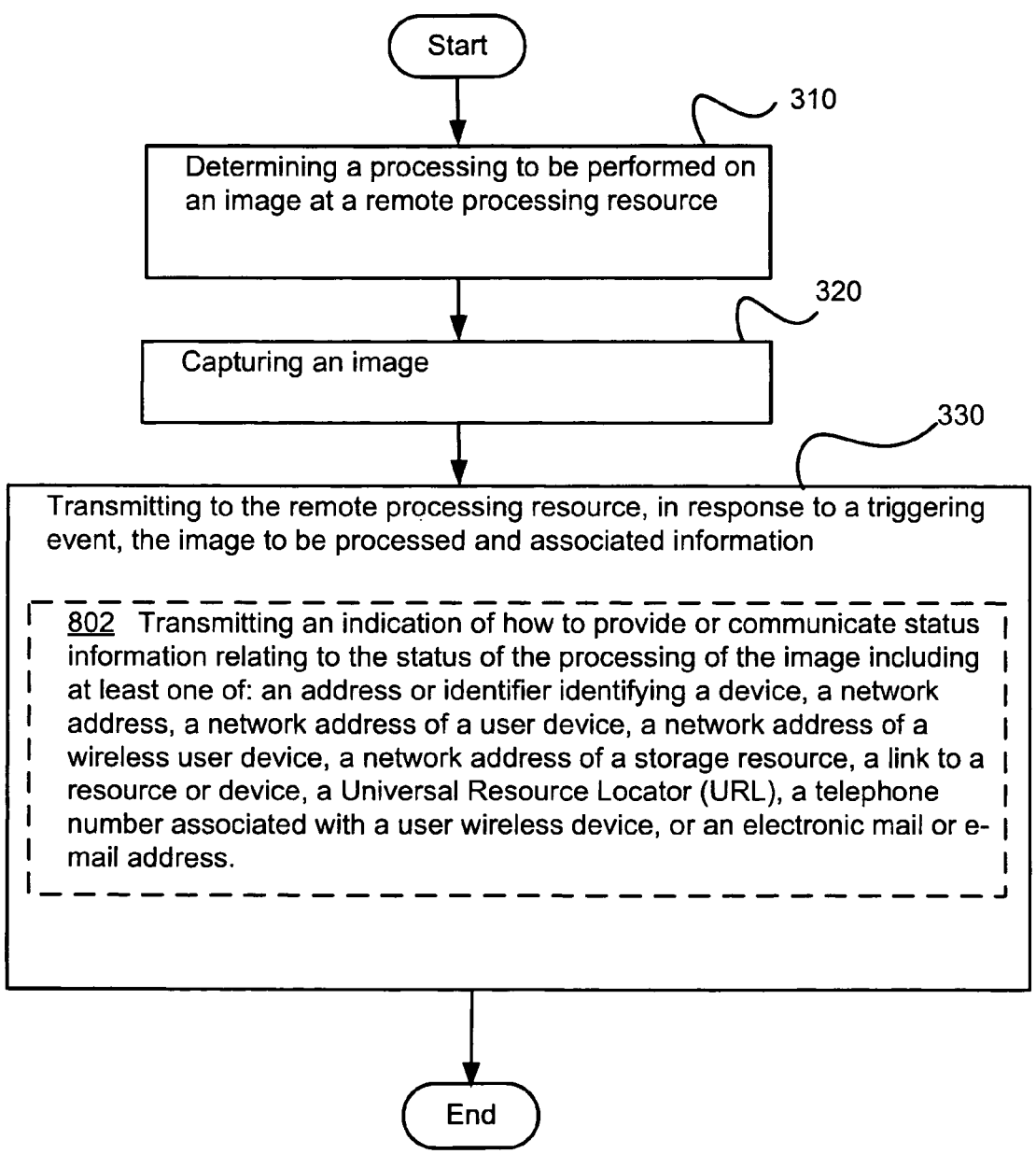
FIG. 8 illustrates an alternative embodiment of the example operational flow 300 of FIG. 3.
Figure 9:
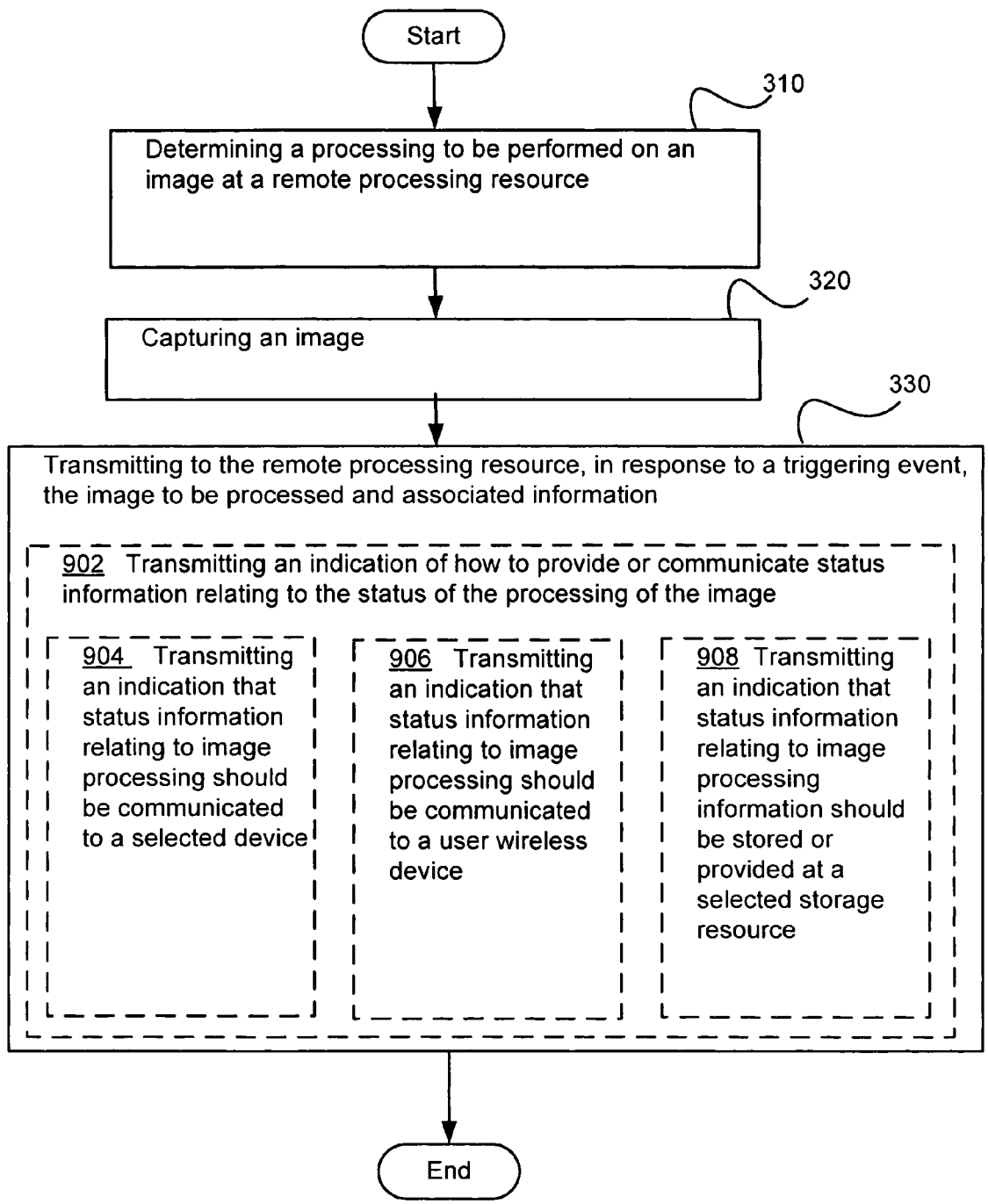
FIG. 9 illustrates an alternative embodiment of the example operational flow 300 of FIG. 3.
Figure 10:
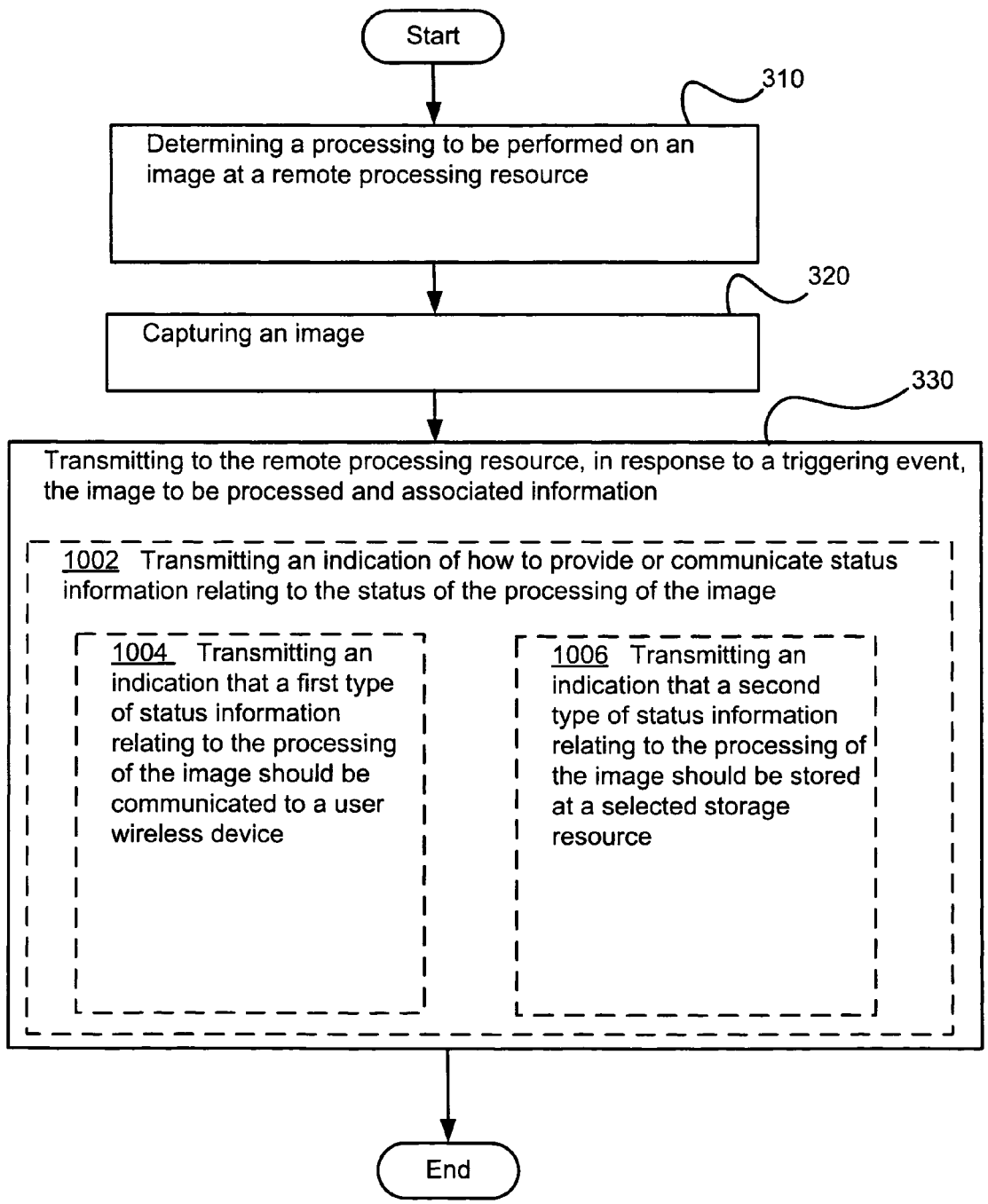
FIG. 10 illustrates an alternative embodiment of the example operational flow 300 of FIG. 3.

At operation 512, an indication is transmitted of how to provide or communicate status information relating to the status of the processing of the image, and is described in greater detail, for example, with reference to FIGS. 8, 9 and 10. For example, a network address of the image capture device or other device may be transmitted to the remote processing resource to allow the user device to receive the processed image.

Figure 11:
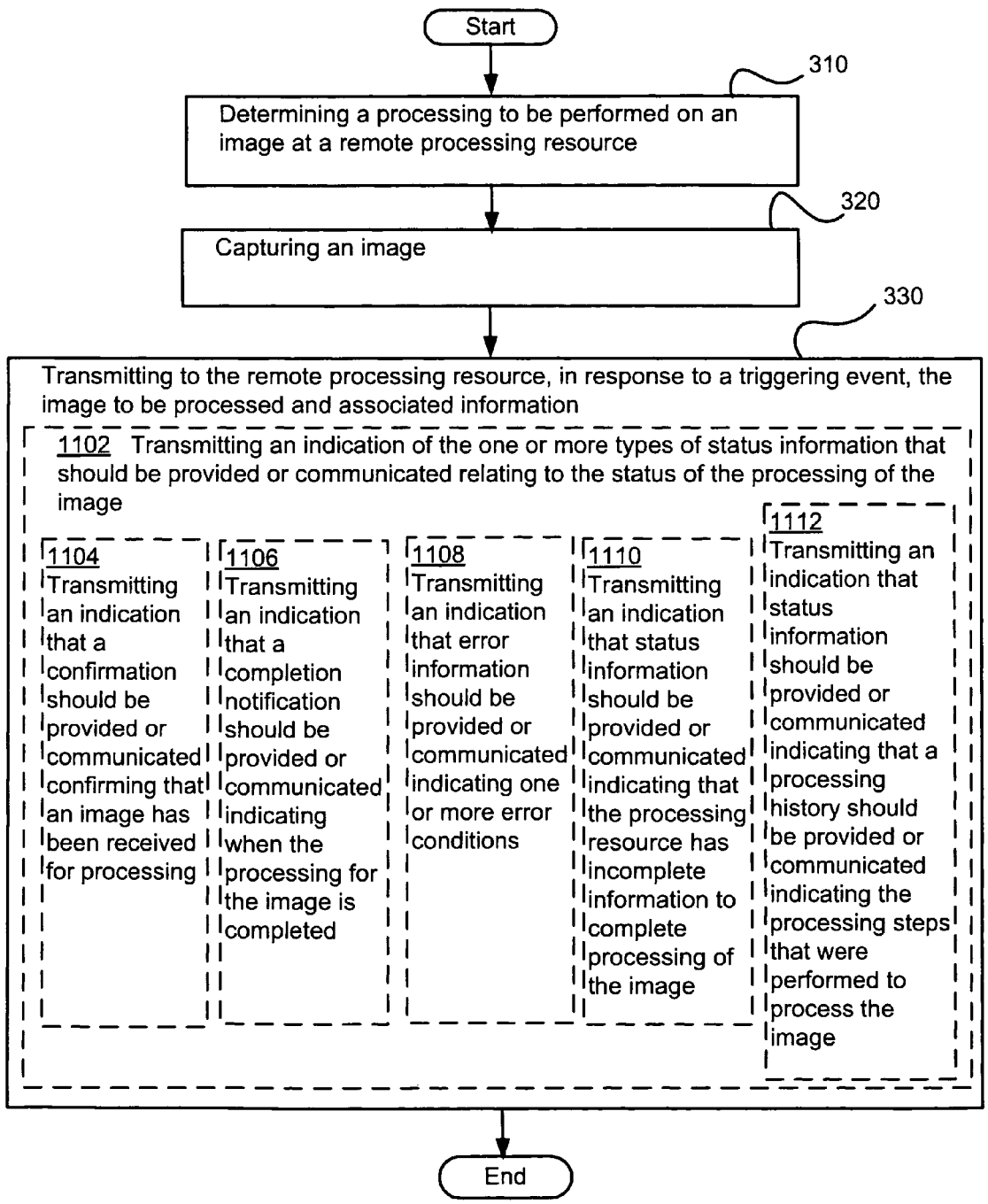
FIG. 11 illustrates an alternative embodiment of the example operational flow 300 of FIG. 3.

At operation 514, an indication is transmitted of the one or more types of status information that should be provided or communicated relating to the status of the processing of the image, and is described in greater detail, for example, with reference to FIG. 11. Status information may be any type of information communicating a status of the processing of an image, such as whether an image has been received for processing, whether processing of an image is complete, etc.

Figure 6:
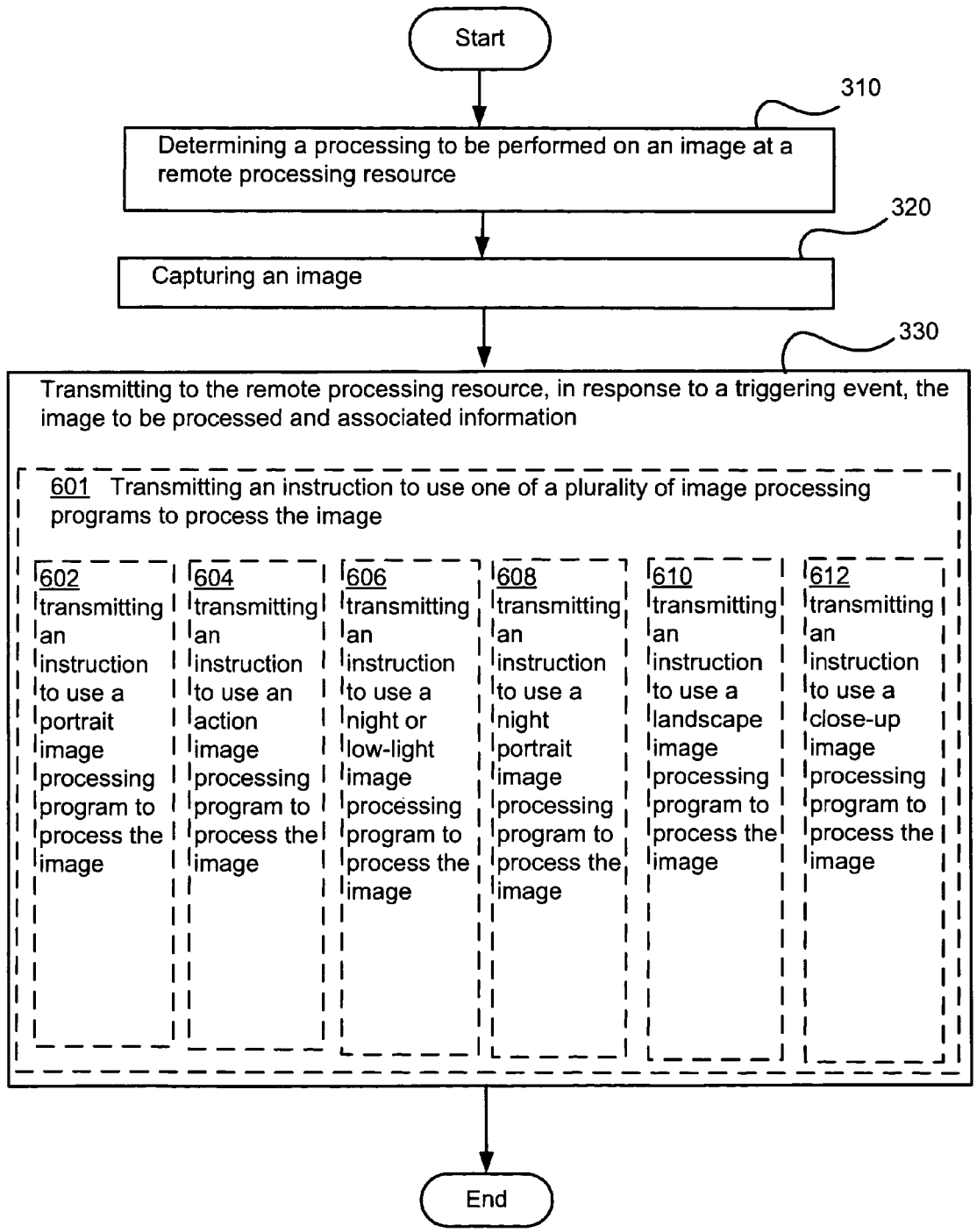
FIG. 6 illustrates an alternative embodiment of the example operational flow 300 of FIG. 3.

FIG. 6 illustrates an alternative embodiment of the example operational flow 300 of FIG. 3. FIG. 6 illustrates an example embodiment where the transmitting operation 330 may include at least one additional operation. Additional operations may include operation 602, operation 604, operation 606, operation 608, operation 610, and operation 612.

At the operation 602, an instruction is transmitted to use a portrait image processing program (or mode) to process the image. At operation 604, an instruction is transmitted to use an action image processing program to process the image. At operation 606, an instruction is transmitted to use a night or low-light image processing program to process the image. At operation 608, an instruction is transmitted to use a night portrait image processing program to process the image. At operation 610, an instruction is transmitted to use a landscape image processing program to process the image. At operation 612, an instruction is transmitted to use a close-up image processing program to process the image. These are just some examples of some common image processing modes or image processing programs, and the subject matter described herein is not limited thereto. Some of these type of modes may be available on cameras in some form. However, according to an example embodiment, at least some of the steps for image processing according to these modes or programs may be offloaded to be processed by a remote processing resource.

FIG. 7 illustrates an alternative embodiment of the example operational flow 300 of FIG. 3. FIG. 7 illustrates an example embodiment where the transmitting operation 330 may include at least one additional operation. Additional operations may include operation 702. At the operation 702, an indication is transmitted of where an image should be transmitted or stored after processing including at least one of: an address or identifier identifying a device, a network address, a network address of a user device, a network address of a wireless user device, a network address of a storage resource, a link to a resource or device, a Universal Resource Locator (URL), a telephone number associated with a user wireless device, or an electronic mail or e-mail address.

FIG. 8 illustrates an alternative embodiment of the example operational flow 300 of FIG. 3. FIG. 8 illustrates an example embodiment where the transmitting operation 330 may include at least one additional operation. Additional operations may include operation 802. At the operation 802, an indication is transmitted of how to provide or communicate status information relating to the status of the processing of the image including at least one of: an address or identifier identifying a device, a network address, a network address of a user device, a network address of a wireless user device, a network address of a storage resource, a link to a resource or device, a Universal Resource Locator (URL), a telephone number associated with a user wireless device, or an electronic mail or e-mail address.

FIG. 9 illustrates an alternative embodiment of the example operational flow 300 of FIG. 3. FIG. 9 illustrates an example embodiment where the transmitting operation 330 may include at least one additional operation. Additional operations may include operation 904, operation 906 and operation 908.

At the operation 904, an indication is transmitted that status information relating to image processing should be communicated to a selected device. For example, an indication may be transmitted that status information (e.g., when processing is complete, whether a problem has been encountered) should be transmitted to the user's wireless PDA, or sent via text message.

At the operation 906, an indication is transmitted that status information relating to image processing should be communicated to a user wireless device, such as a user cell phone.

At operation 908, an indication is transmitted that status information relating to image processing information should be stored or provided at a selected storage resource. For example, an indication may be transmitted indicating that image processing status information should be stored on a server or a particular web site.

FIG. 10 illustrates an alternative embodiment of the example operational flow 300 of FIG. 3. FIG. 10 illustrates an example embodiment where the transmitting operation 330 may include at least one additional operation. Additional operations may include operation 1004 and operation 1006. At the operation 1004, an indication is transmitted that a first type of status information relating to the processing of the image should be communicated to a user wireless device. At operation 1006, an indication is transmitted that a second type of status information relating to the processing of the image should be stored at a selected storage resource. For example an indication may be provided that status information related to errors or problems in the processing or status indicating when processing of an image is complete should be transmitted to a user's wireless cell phone or PDA, while an indication may also be provided that a processing history for an image should be stored on a web site or server identifying the process steps performed to process an image. This may allow different types of status information to be communicated to a user in different ways.

FIG. 11 illustrates an alternative embodiment of the example operational flow 300 of FIG. 3. FIG. 11 illustrates an example embodiment where the transmitting operation 330 may include at least one additional operation. Additional operations may include operation 1104, operation 1106, operation 1108, operation 1110 and operation 1112.

At the operation 1104, an indication is transmitted that a confirmation should be provided or communicated confirming that an image has been received for processing. At the operation 1106, an indication is transmitted that a completion notification should be provided or communicated indicating when the processing for the image is completed.

At operation 1108, an indication is transmitted that error information should be provided or communicated indicating one or more error conditions. For example, an indication may be transmitted from an image capture device to a remote processing center 106 that error information should be communicated via text message or email when an error occurs in the processing of an image. For instance, an error message may be sent by the remote processing resource to the image capture device if the requested processing cannot be performed or the requested processing result or goal cannot be achieved, or to indicate that a processing other than the requested processing was performed on the image.

At operation 1110, an indication is transmitted that status information should be provided or communicated indicating that the image processing resource (e.g., remote processing resource) has incomplete information to complete the processing of the image. For instance, the remote processing resource may communicate to the image capture device or user when inadequate or incomplete payment information has been received (e.g., credit card on file is now expired). At operation 1112, an indication is transmitted that status information should be provided or communicated indicating that a processing history should be provided or communicated indicating the processing steps that were performed to process the image. For example, the image capture device may request the image processing resource to log or store the processing history on a particular server or website that may be accessed by the user.

Figure 12:
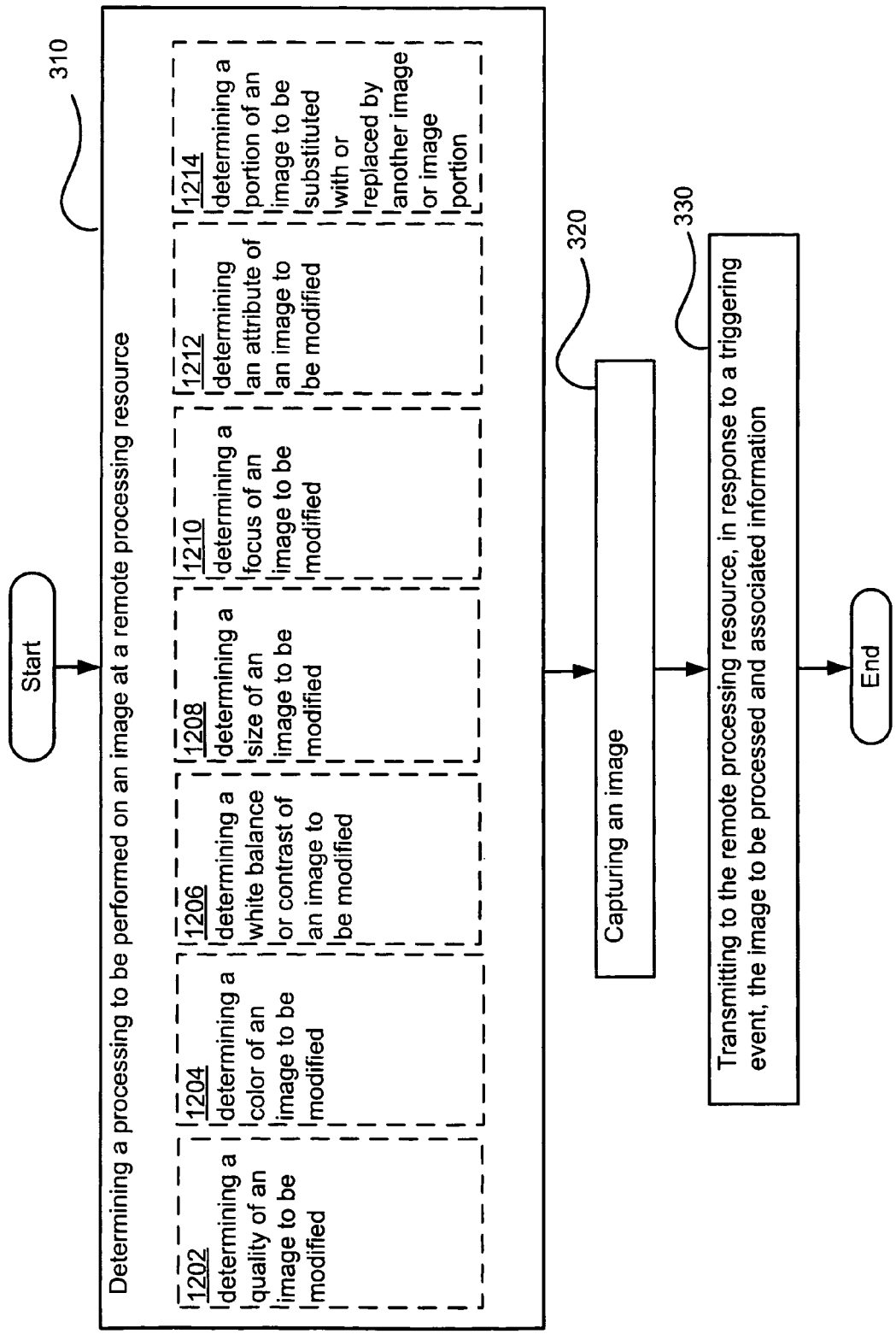
FIG. 12 illustrates an alternative embodiment of the example operational flow 300 of FIG. 3.

FIG. 12 illustrates an alternative embodiment of the example operational flow 300 of FIG. 3. FIG. 12 illustrates an example embodiment where the determining operation 310 may include at least one additional operation. Additional operations may include operation 1202, operation 1204, operation 1206, operation 1208, operation 1210, operation 1212, and operation 1214.

At the operation 1202, a quality of an image to be modified is determined. For example, it may be determined to improve the quality of an image. At operation 1204, a color of an image to be modified is determined. At operation 1206, a white balance or contrast of an image is determined to be modified. At operation 1208, a size of an image to be modified is determined. For example it may be determined to reduce an image size by 50%. At operation 1210, a focus of an image to be modified may be determined. For example, it may be determined that the focus of an image will be improved, or that the focus should be modified of a particular object in an image.

At operation 1212, an attribute of an image to be modified is determined. There may be a wide variety of attributes of an image that may be modified, e.g., by remote processing resource 106, such as size, color, sharpness, focus, white balance, etc. At operation 1214, a portion of an image is determined to be substituted with or replaced by another image or image portion. For example, it may be determined that a portion of an image to be processed may be replaced with a portion of another (e.g., similar) image obtained from, e.g., image-related database 108 (FIG. 1) or other source, in order to improve the processing of the image.

Figure 13:
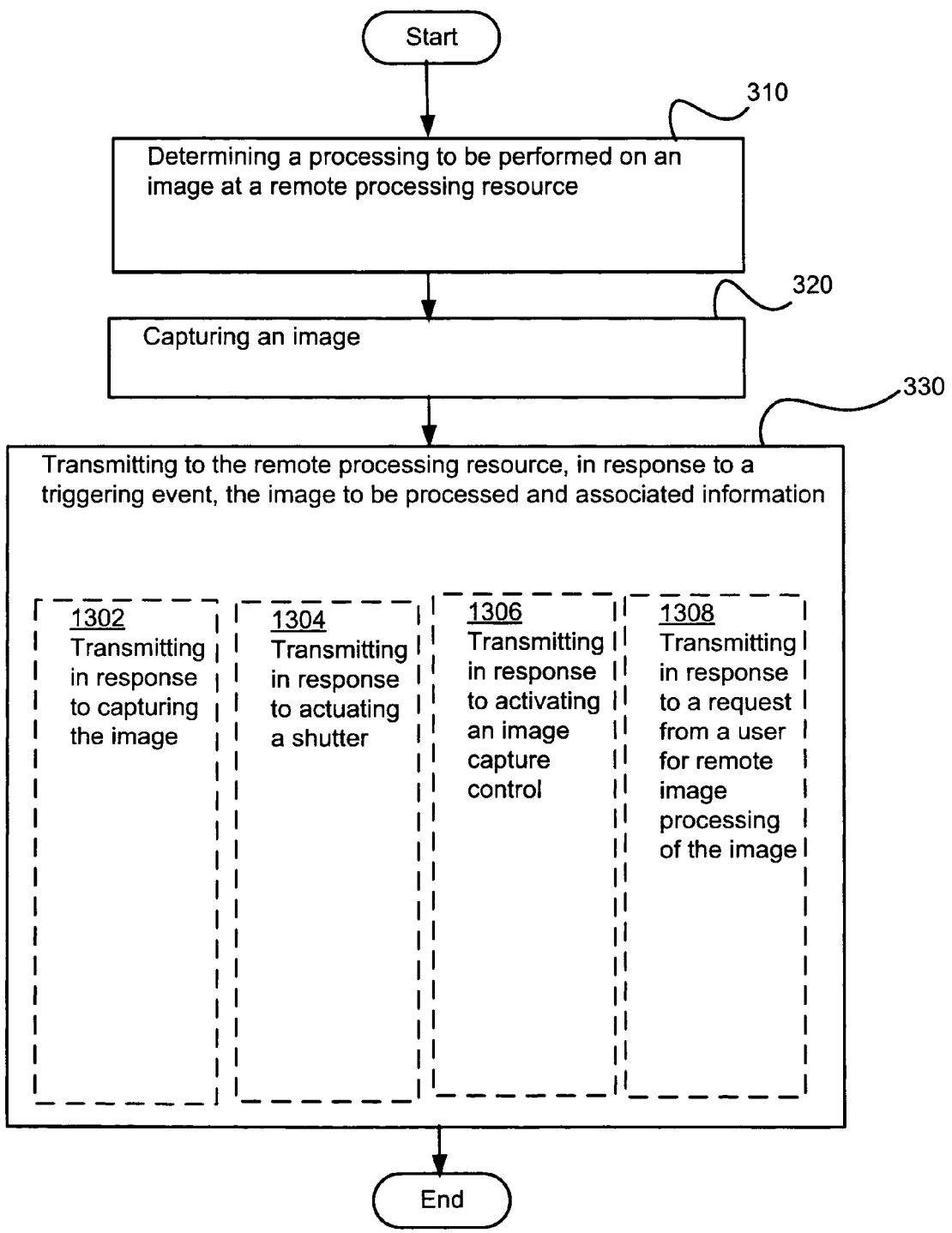
FIG. 13 illustrates an alternative embodiment of the example operational flow 300 of FIG. 3.

FIG. 13 illustrates an alternative embodiment of the example operational flow 300 of FIG. 3. FIG. 13 illustrates an example embodiment where the transmitting operation 330 may include at least one additional operation. Additional operations may include operation 1302, operation 1304, operation 1306 and operation 1308.

There may be a number of different triggering events that may cause the image capture device 102 to transmit the image to be processed and associated information to the remote processing resource. At the operation 1302, the transmitting may be performed in response to capturing of the image. This may result in the image being transmitted substantially immediately after being captured, for example.

At operation 1304, the transmitting is performed in response to actuating a shutter. In this example, a transmission of the image may be, for example, started upon actuation of the shutter, even though the image may not yet be completely captured. At operation 1306, the transmitting is performed in response to activating an image capture control, such as, for example, selecting the button to take a picture on a camera or image capture device. At operation 1308, the transmitting is performed in response to a request from a user for remote image processing. For example, after one or more pictures have been captured, the user may view a menu of options and may select the option on the image capture device "send for remote image processing."

Figure 14:
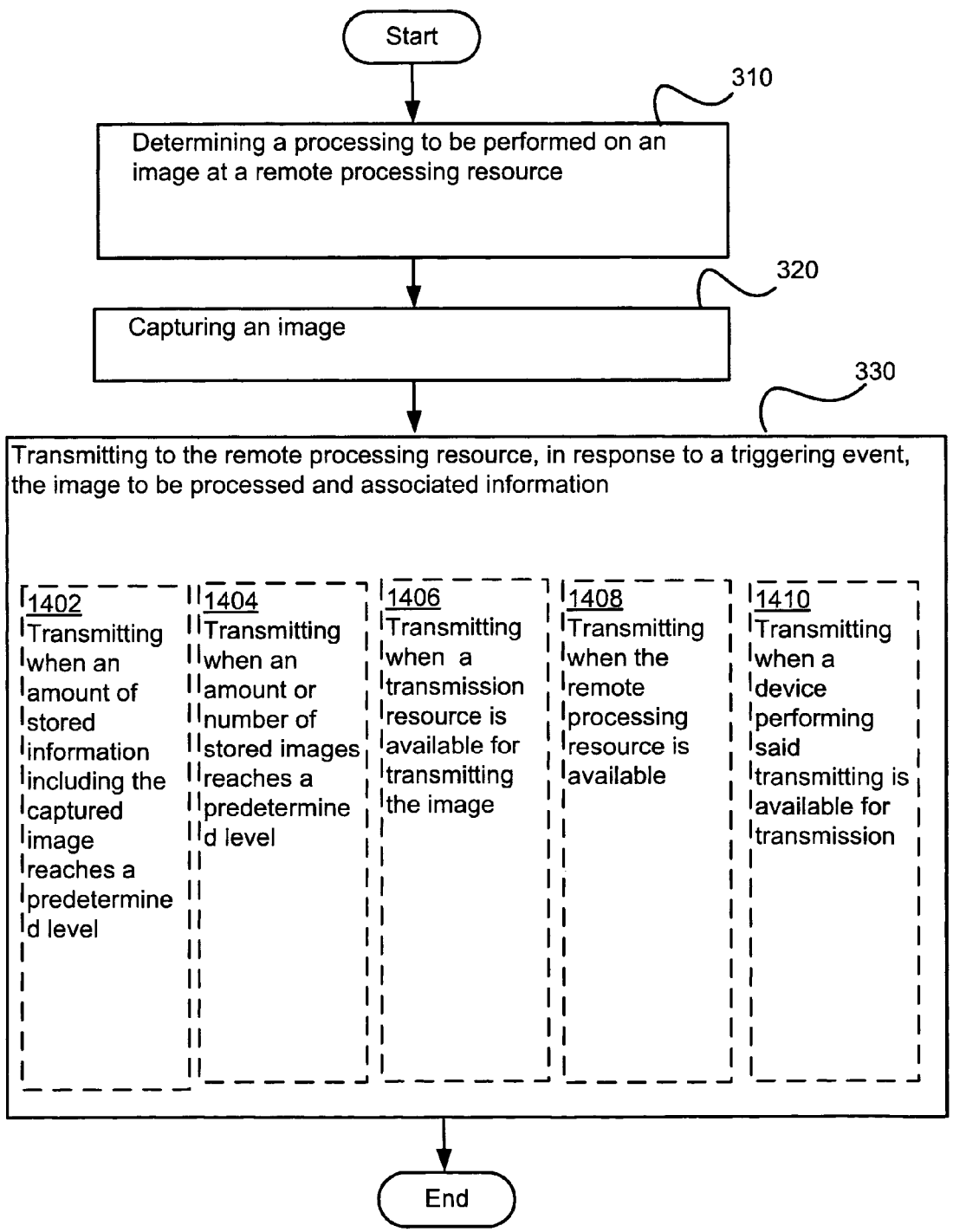
FIG. 14 illustrates an alternative embodiment of the example operational flow 300 of FIG. 3.

FIG. 14 illustrates an alternative embodiment of the example operational flow 300 of FIG. 3. FIG. 14 illustrates an example embodiment where the transmitting operation 330 may include at least one additional operation. Additional operations may include operation 1402, operation 1404, operation 1406, operation 1408 and operation 1410.

There may be a number of additional triggering events that may cause the image capture device 102 to transmit the image to be processed and associated information to the remote processing resource. At the operation 1402, the transmitting is performed when an amount of stored information including the captured image reaches a predetermined level. For example, capturing logic 204 of image capture device 102 may include a memory to at least temporarily store captured images and other information. To avoid running out of memory (e.g., which may prevent capturing further images), image capture device 102 may automatically transmit (either with or without user confirmation) the one or more captured images to a selected remote processing resource for processing when the memory becomes 90% full, for example. When that occurs, image capture device 102 may automatically transmit the captured images or may prompt the user to transmit the images due to a full memory. After the image capture device or user receives confirmation that the remote processing resource 106 has received the transmitted images, image capture device 102 may delete these images from its memory.

At the operation 1404, the transmitting is performed when an amount or number of stored images reaches a predetermined level, such as by reaching 100 images in memory, for example. Again, when this occurs, image capture device 102 may automatically transmit the images to the remote processing resource 106 or may prompt the user to transmit the images due to a full memory.

At operation 1406, the transmitting is performed when a transmission resource is available for transmitting the image. For example, the image capture device 102 may detect when it is in range of a wireless network, and may then transmit the image to the remote processing resource 106 for processing. At operation 1408, the transmitting is performed when the remote processing resource is available. For example, the image capture device 102 may first communicate with the remote processing resource 106 to confirm that the resource is online and/or is available to perform processing of the image, before the image is transmitted. At operation 1410, the transmitting is performed when a device performing the transmitting is available for transmission. For example, image capture device 102 may wait for an idle period (e.g., when it is not busy communicating other voice or data signals) to transmit the images stored in memory to the remote processing resource.

Figure 15:
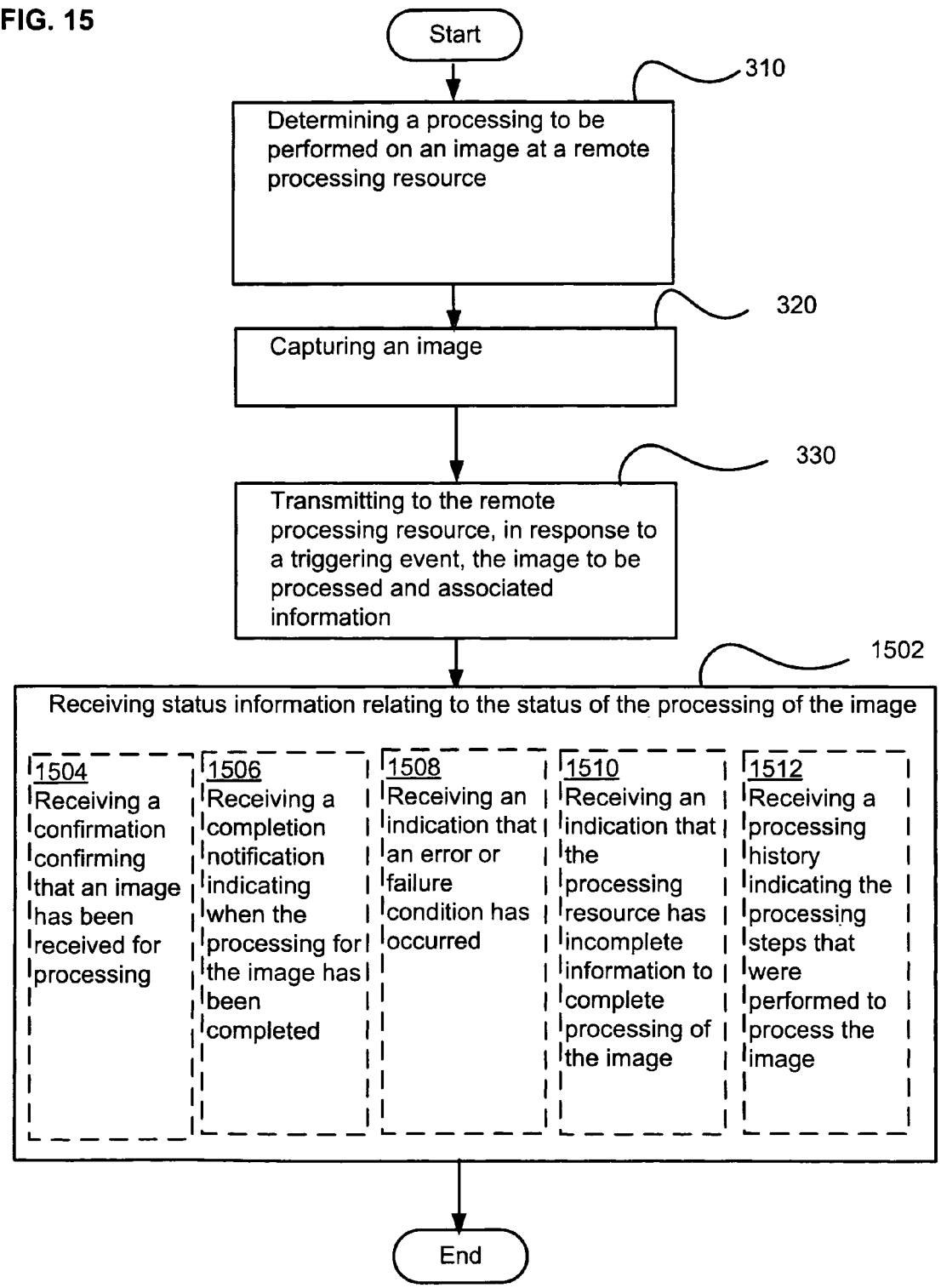
FIG. 15 illustrates an alternative embodiment of the example operational flow 300 of FIG. 3.

FIG. 15 illustrates an alternative embodiment of the example operational flow 300 of FIG. 3. FIG. 15 illustrates an example embodiment that may include at least one additional operation. Additional operations may include operation 1502, operation 1504, operation 1506, operation 1508, operation 1510 and operation 1512. Operations 1504, 1506, 1508, 1510 and 1512 are additional operations that may each be performed in addition to or in association with operation 1502.

At the operation 1502, status information is received relating to the status of the processing of the image. A number of different types of status information may be received, such as an indication that an image has been received at a remote processing resource for processing.

At operation 1504, a confirmation is received confirming that an image has been received for processing. For example, this confirmation received by image capture device 102 may allow the image capture device to erase the images from its memory, thereby freeing up additional memory for new images. At operation 1506, a completion notification is received indicating when the processing of an image has been completed. At operation 1508, an indication is received that an error or failure condition has occurred. For example, an image capture device 102 may receive a wireless text message from remote processing resource 106 that the requested processing cannot be performed on an image, and may allow the user or image capture device to select an alternative processing for the image.

At operation 1510, an indication is received that the processing resource has incomplete information to complete processing of the image. For example, image capture device 102 may receive a message from remote processing resource 106 that no or incomplete payment information was received to pay for processing of the images. At operation 1512, a processing history is received indicating the processing steps that were performed to process the image. For example, image capture device 102 may receive via wireless link (from the remote processing resource) or may retrieve from a website or storage resource a processing history for each processed image that describes the one or more image processing steps performed to process the image. An example processing history may indicate for an image: white balance adjusted; image cropped; color enhanced, etc.

Figure 16:
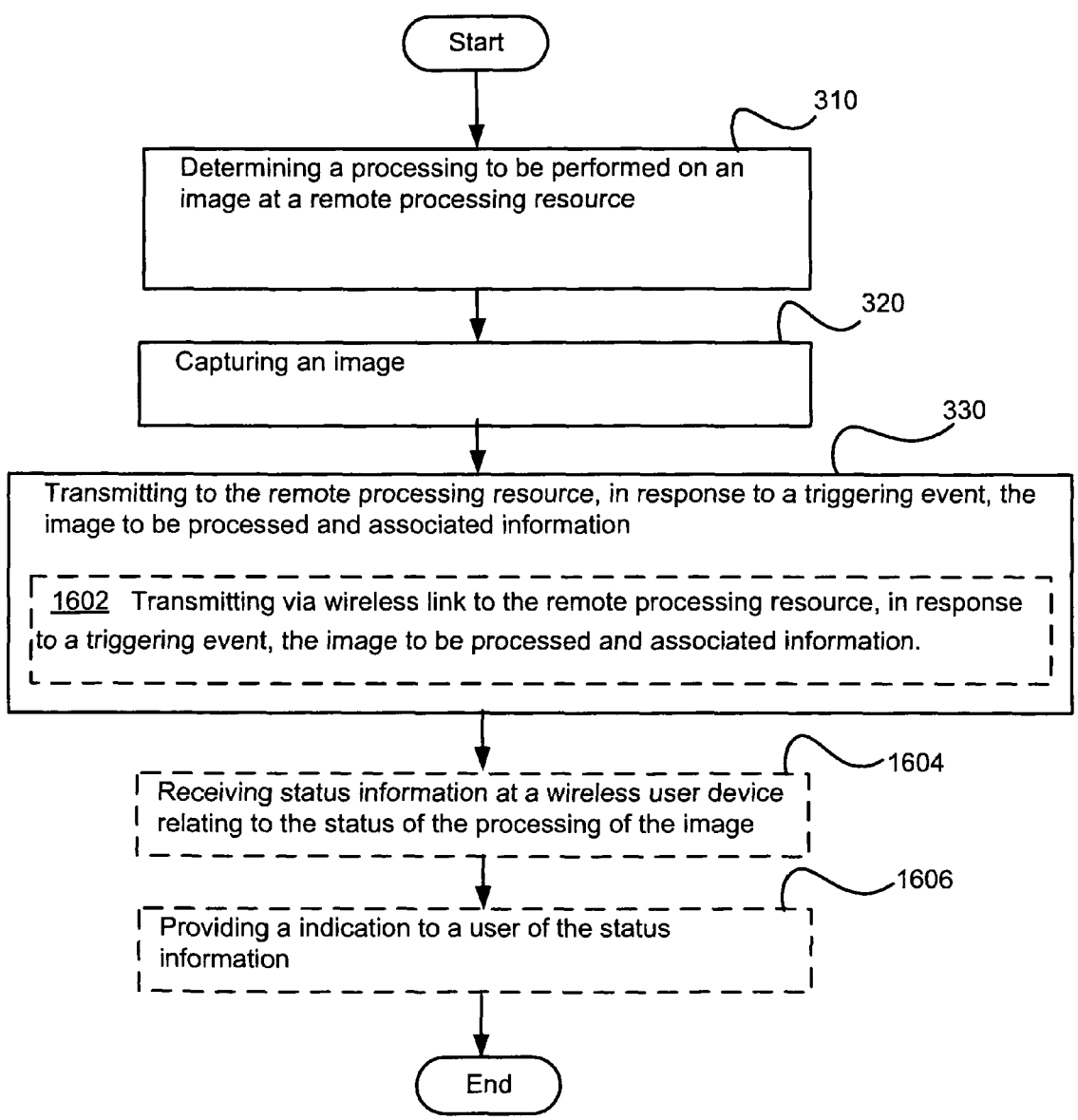
FIG. 16 illustrates an alternative embodiment of the example operational flow 300 of FIG. 3.

FIG. 16 illustrates an alternative embodiment of the example operational flow 300 of FIG. 3. FIG. 16 illustrates an example embodiment that may include at least one additional operation and where the transmitting operation 330 may include at least one additional operation. Additional operations may include operation 1602, operation 1604 and operation 1606. Operation 1602 may be an additional operation to transmitting operation 330, while operations 1604 and operation 1606 may be additional operations for flow 300.

At the operation 1602, an image to be processed and associated information is transmitted via wireless link to the remote processing resource in response to a triggering event. For example, image capture device may transmit an image and associated information (e.g., an indication of the processing to be performed on the image and/or payment information) to the remote processing resource 106 in response to a user request.

At operation 1604, status information relating to the status of the processing of the image is received at a wireless user device. The status information may include, for example, a message indicating that the image was received by the remote processing resource 106 or that processing has been completed and the image may be retrieved from a particular website or storage resource (e.g., link provided in the status information). Or in another example, a message is sent to the user or image capture device indicating that an error has occurred relating to the processing of the image. At operation 1606, an indication of the status information is provided to the user. For example, in response to the message that an error has occurred, an audio or visual indication may be provided to the user, e.g., the image capture device 102 may beep or a light may flash to indicate an error in processing.

Figure 17:
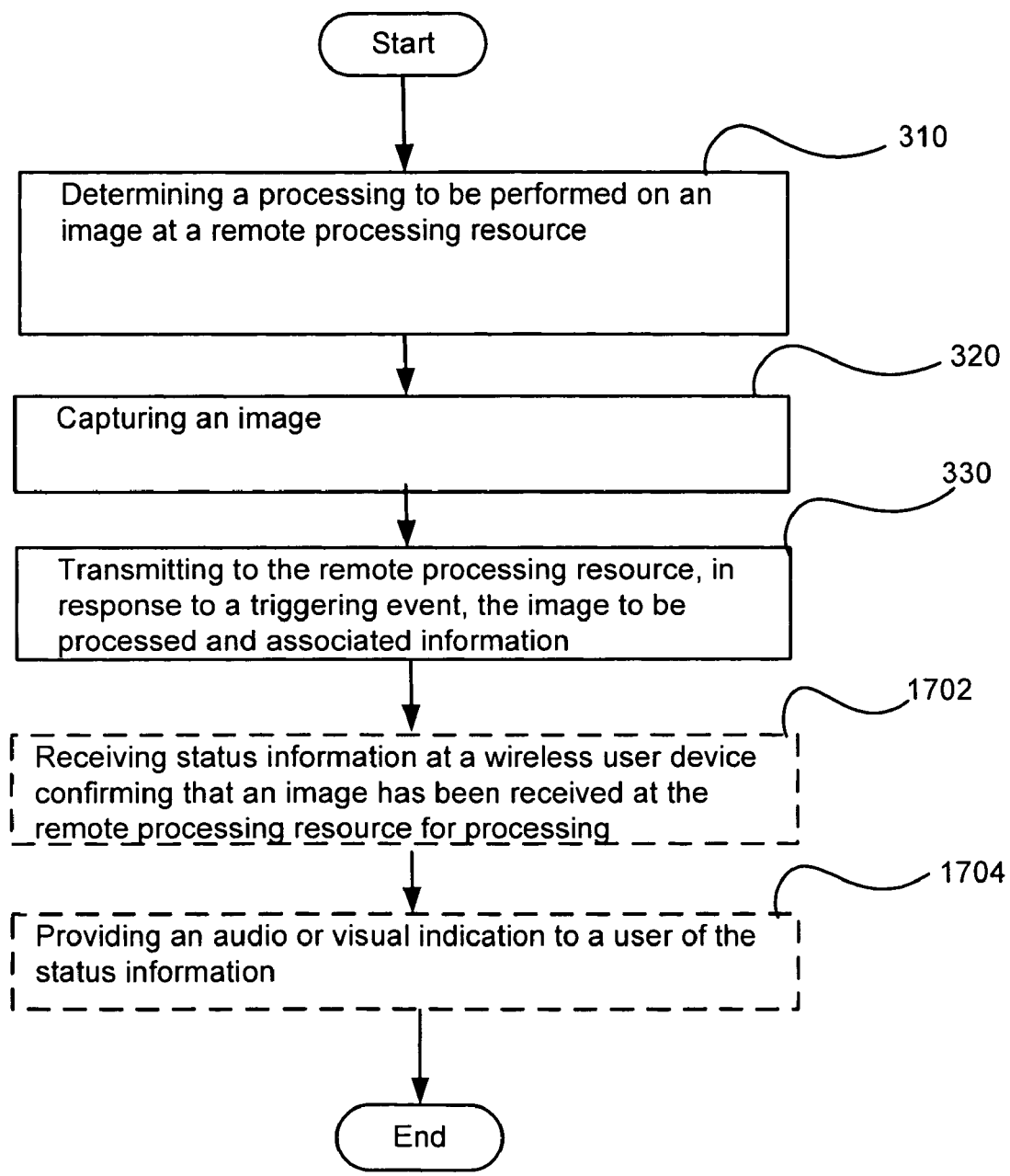
FIG. 17 illustrates an alternative embodiment of the example operational flow 300 of FIG. 3.

FIG. 17 illustrates an alternative embodiment of the example operational flow 300 of FIG. 3. FIG. 17 illustrates an example embodiment that may include at least one additional operation. Additional operations may include operation 1702 and operation 1704.

At operation 1702, status information confirming that an image has been received at the remote processing resource is received at a wireless user device. At operation 1704, an audio or visual indication of the status information is provided to the user. For example, in response to receiving a message confirming receipt of the image at the remote processing resource 106, an audio or visual indication may be provided to the user, e.g., the image capture device 102 may beep or a light may flash to indicate that the image was received at the image processing resource for processing.

Figure 18:
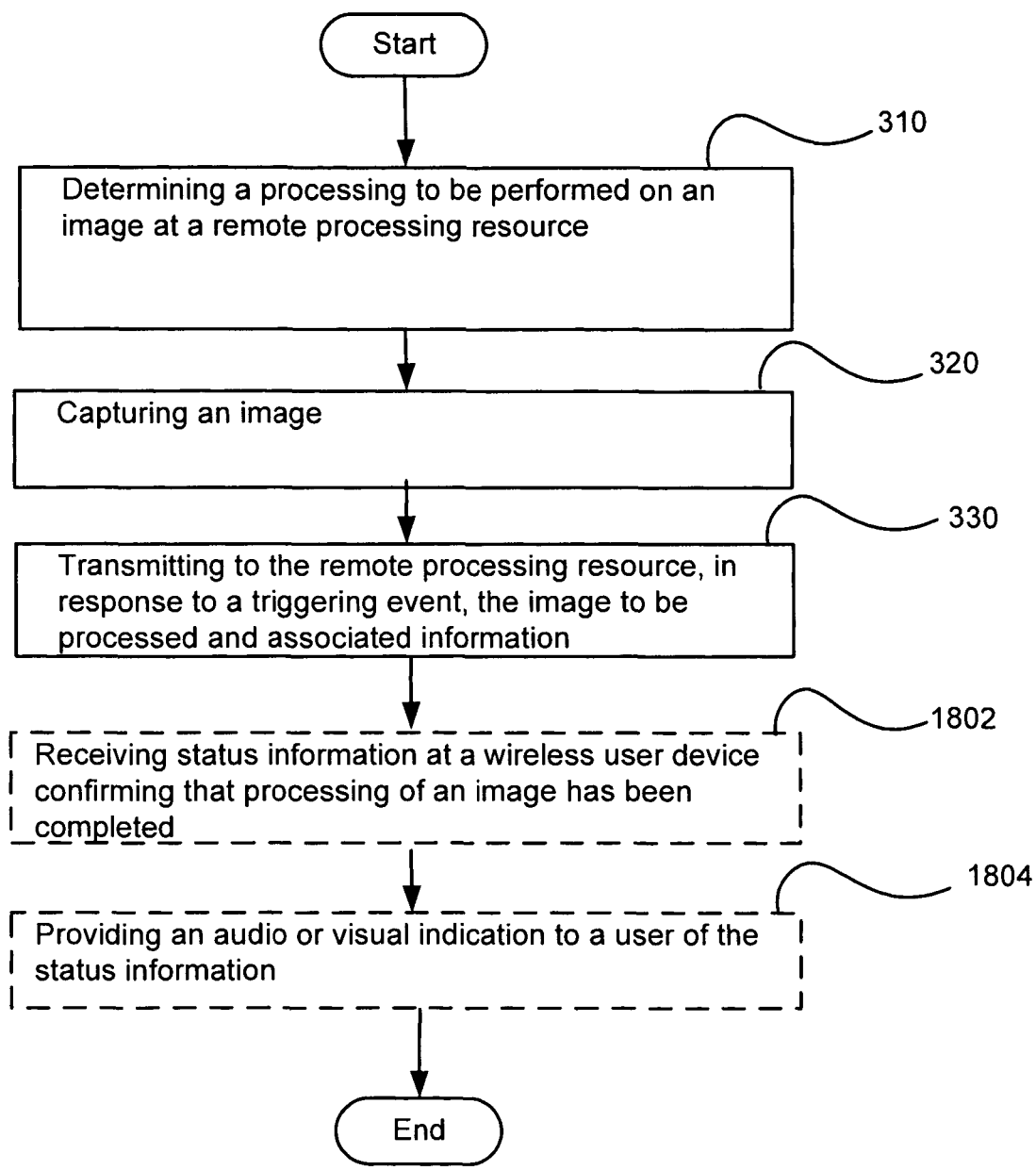
FIG. 18 illustrates an alternative embodiment of the example operational flow 300 of FIG. 3.

FIG. 18 illustrates an alternative embodiment of the example operational flow 300 of FIG. 3. FIG. 18 illustrates an example embodiment that may include at least one additional operation. Additional operations may include operation 1802 and operation 1804.

At operation 1802, status information confirming that processing of an image has been completed is received at a wireless user device. At operation 1804, an audio or visual indication of the status information is provided to the user. For example, in response to receiving a wireless text message or wireless email indicating that image #42 was processed, a visual or graphical display may be presented to the user on the image capture device 102 or other user device indicating which images sent for processing have completed processing and which have not been completed (yet).

Figure 19:
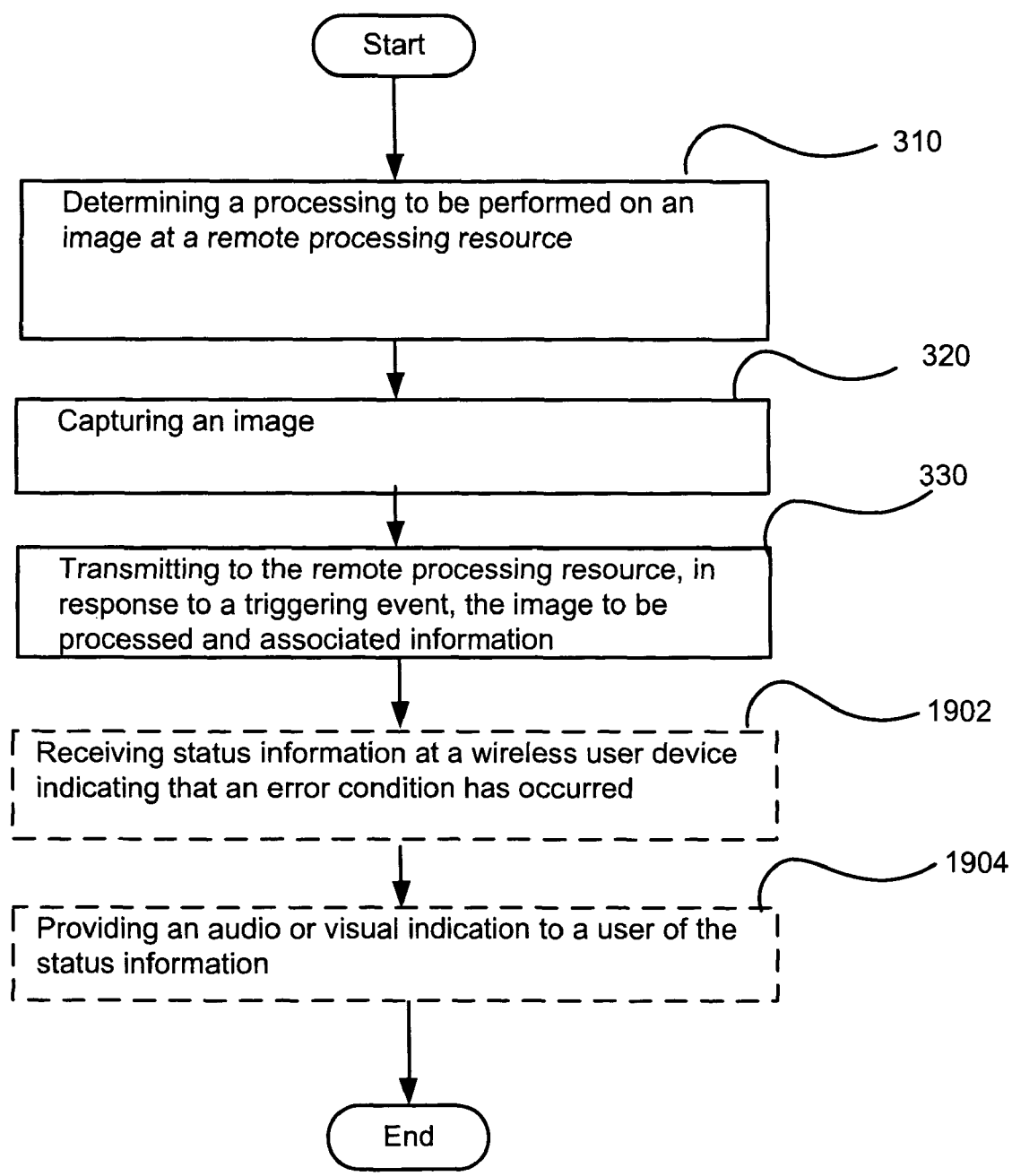
FIG. 19 illustrates an alternative embodiment of the example operational flow 300 of FIG. 3.

FIG. 19 illustrates an alternative embodiment of the example operational flow 300 of FIG. 3. FIG. 19 illustrates an example embodiment that may include at least one additional operation. Additional operations may include operation 1902 and operation 1904.

At operation 1902, status information indicating that an error condition has occurred is received at a wireless user device. For example, image capture device 102 may receive a message indicating that a requested image processing could not be performed for an image. At operation 1904, an audio or visual indication of the status information is provided to the user. For example, in response to receiving the error message, the image capture device 102 may beep or a light may flash on the device to alert the user to the error condition.

Figure 20:
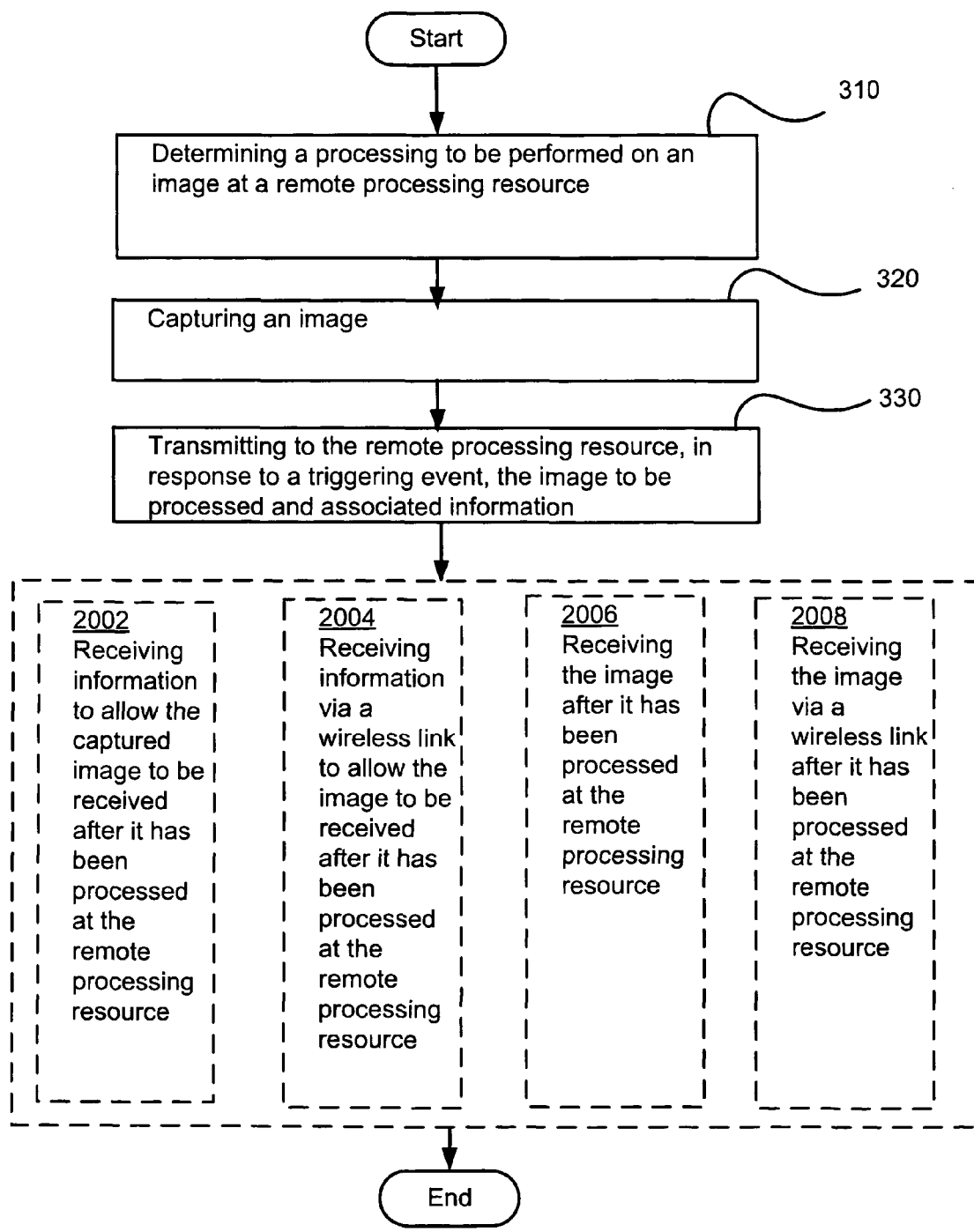
FIG. 20 illustrates an alternative embodiment of the example operational flow 300 of FIG. 3.

FIG. 20 illustrates an alternative embodiment of the example operational flow 300 of FIG. 3. FIG. 20 illustrates an example embodiment that may include at least one additional operation. Additional operations may include operation 2002, operation 2004, operation 2006 and operation 2008.

At operation 2002, information is received to allow the captured image to be received after it has been processed at the remote processing resource. For example, the image capture device 102 or other user device may receive a resource identifier such as a link to a website or server where the processed image may be retrieved or viewed. At operation 2004, information is received via wireless link to allow the image to be received after it has been processed at the remote processing resource, which may include receiving a URL or other link via wireless link to allow the image capture device 102 to download the processed image.

At operation 2006, the image is received after it has been processed at the remote processing resource. For example, after the image has been processed at remote processing resource 106, the image may be transmitted via network 110 and device 104 and received by image capture device 102. At operation 2008, the image is received via a wireless link after it has been processed at the remote processing resource.

Figure 21:
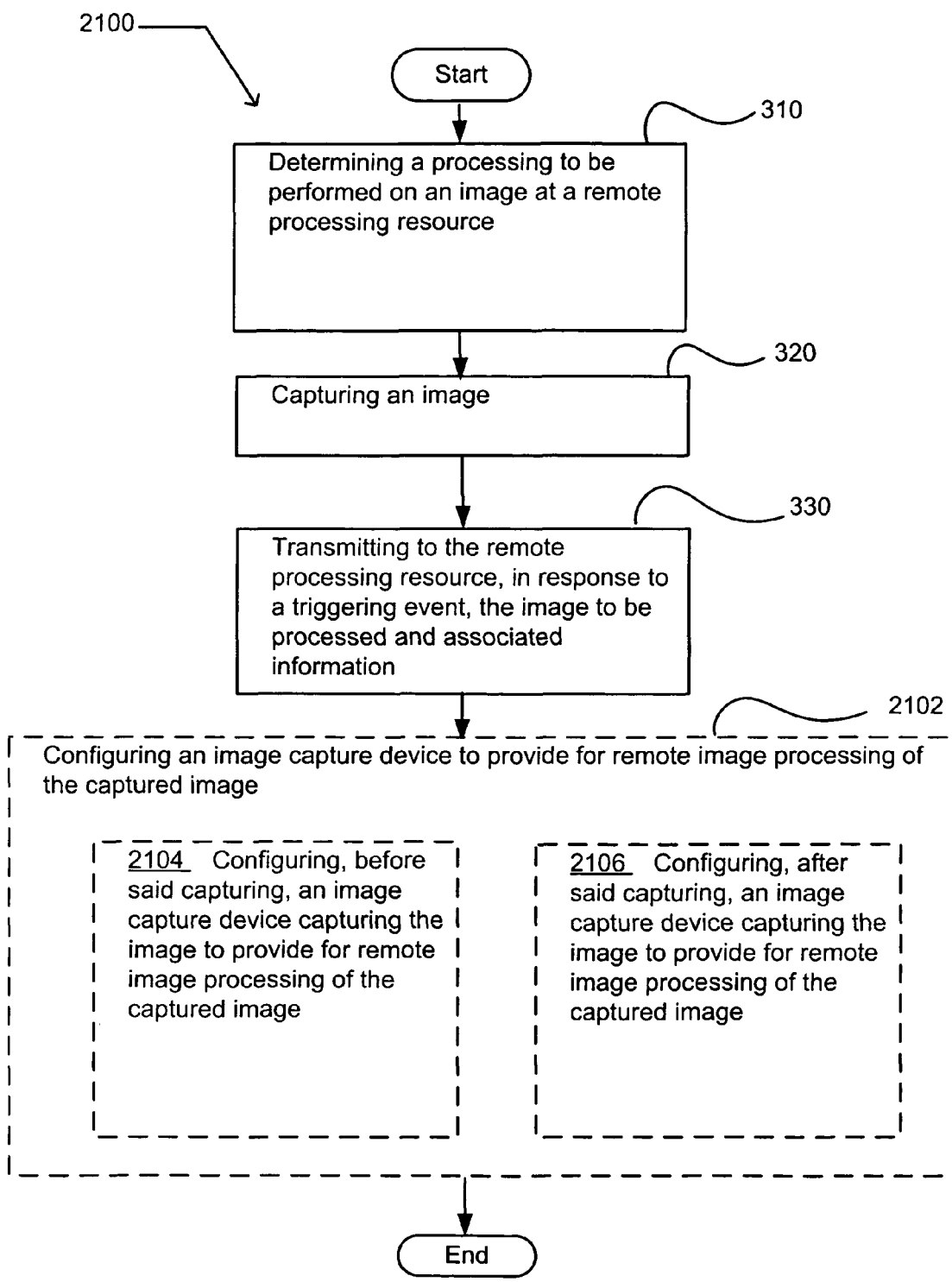
FIG. 21 illustrates an alternative embodiment of the example operational flow 300 of FIG. 3.

FIG. 21 illustrates an alternative embodiment of the example operational flow 300 of FIG. 3. FIG. 21 illustrates an example operational flow 2100 that may include at least one additional operation. Additional operations may include operation 2102, operation 2104 and operation 2106.

At operation 2102, an image capture device is configured to provide for remote image processing of the captured image. There are a number of different ways in which an image capture device may be configured to provide for remote processing, such as by identifying a user, providing user payment information, selecting a remote processing resource, etc. At operation 2104, an image capture device is configured, before the capturing, to provide for remote image processing of the captured image. For example, prior to capturing an image, a user may pre-select or pre-configure image capture device 102 to transmit images to a selected remote processing resource 106. At operation 2106, an image capture device is configured, after the capturing, to provide for remote image processing of the captured image. For example, after capturing an image, a user may be prompted to configure or otherwise may configure image capture device 102 to transmit images to a selected remote processing resource 106 (e.g., user may select one of a plurality of remote processing resources, and then may select that images are "sent upon capture to remote processing resource").

Figure 22:
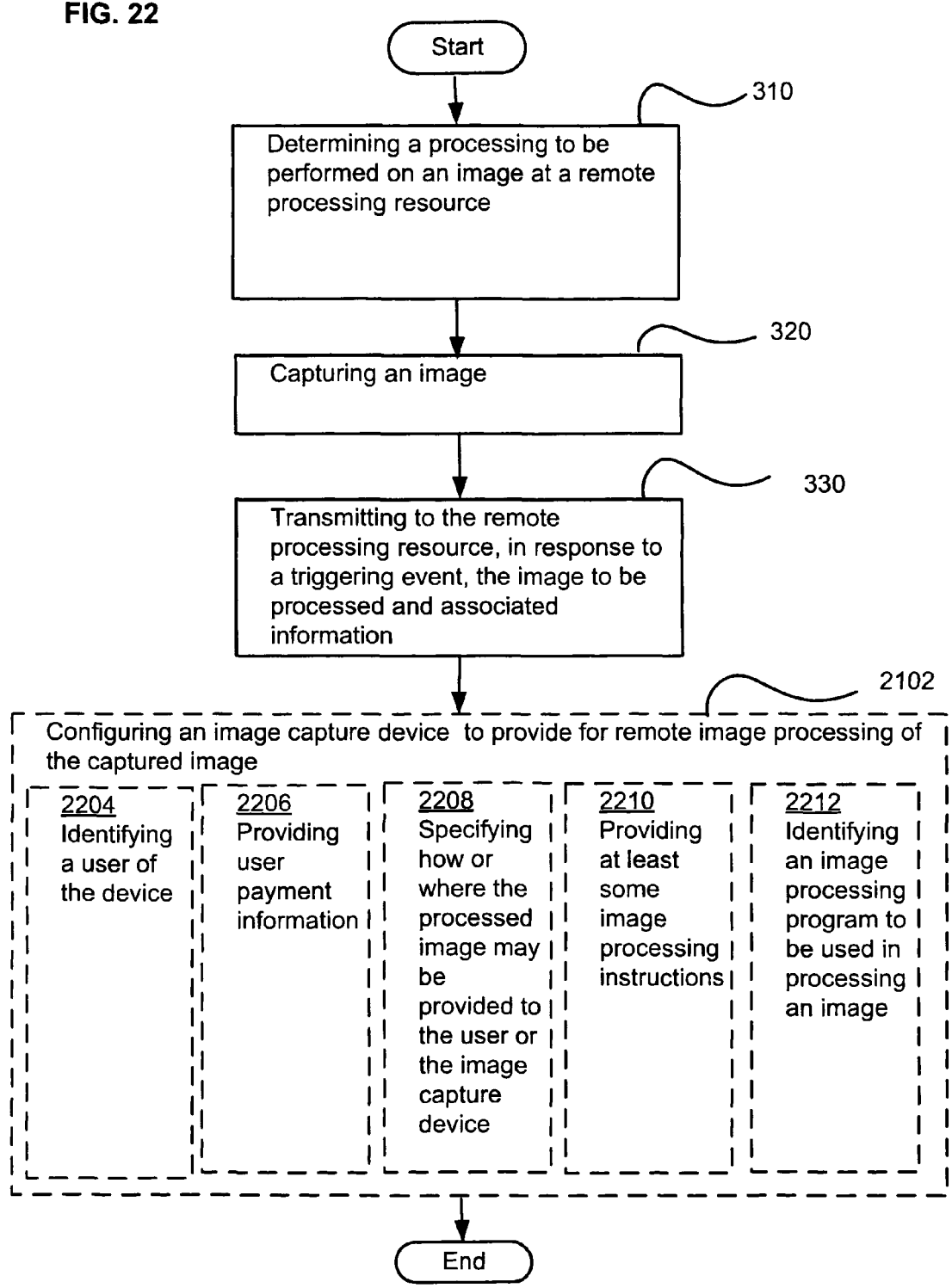
FIG. 22 illustrates an alternative embodiment of the example operational flow 2100 of FIG. 21.

FIG. 22 illustrates an alternative embodiment of the example operational flow 2100 of FIG. 21. FIG. 22 illustrates an example embodiment wherein the configuring operation 2102 of operational flow 2100 may include at least one additional operation. Additional operations may include operation 2204, operation 2206, operation 2208, operation 2210 and operation 2212. The various operations 2204-2212 may illustrate different examples of how an image capture device may be configured to provide for remote image processing.

At operation 2204, a user of a device is identified. For example, a user may be identified by name, by an account number (e.g., service account with remote processing resource), by the user's email address, by a telephone number, or other identifier. The user may input or provide this user information to the image capture device, for example. At operation 2206, user payment information is provided, such as by a user inputting or providing credit card or other payment information to the image capture device, for example.

At operation 2208, a user specifies how or where the processed image may be provided to the user or the image capture device. For example, the user may input information to the image capture device 102 to specify that the processed image should be returned to the image capture device, or should be stored at a specified website, etc. At operation 2210, at least some image processing instructions are specified, such as specifying to improve the focus or white balance of an image.

At operation 2212, an image processing program is identified to be used in processing the image. For example, a user may specify that a particular image processing program such as "portrait" should be used to process an image. There may be a set of processing steps that the remote processing resource will perform for each image processing program or mode, for example.

Figure 23:
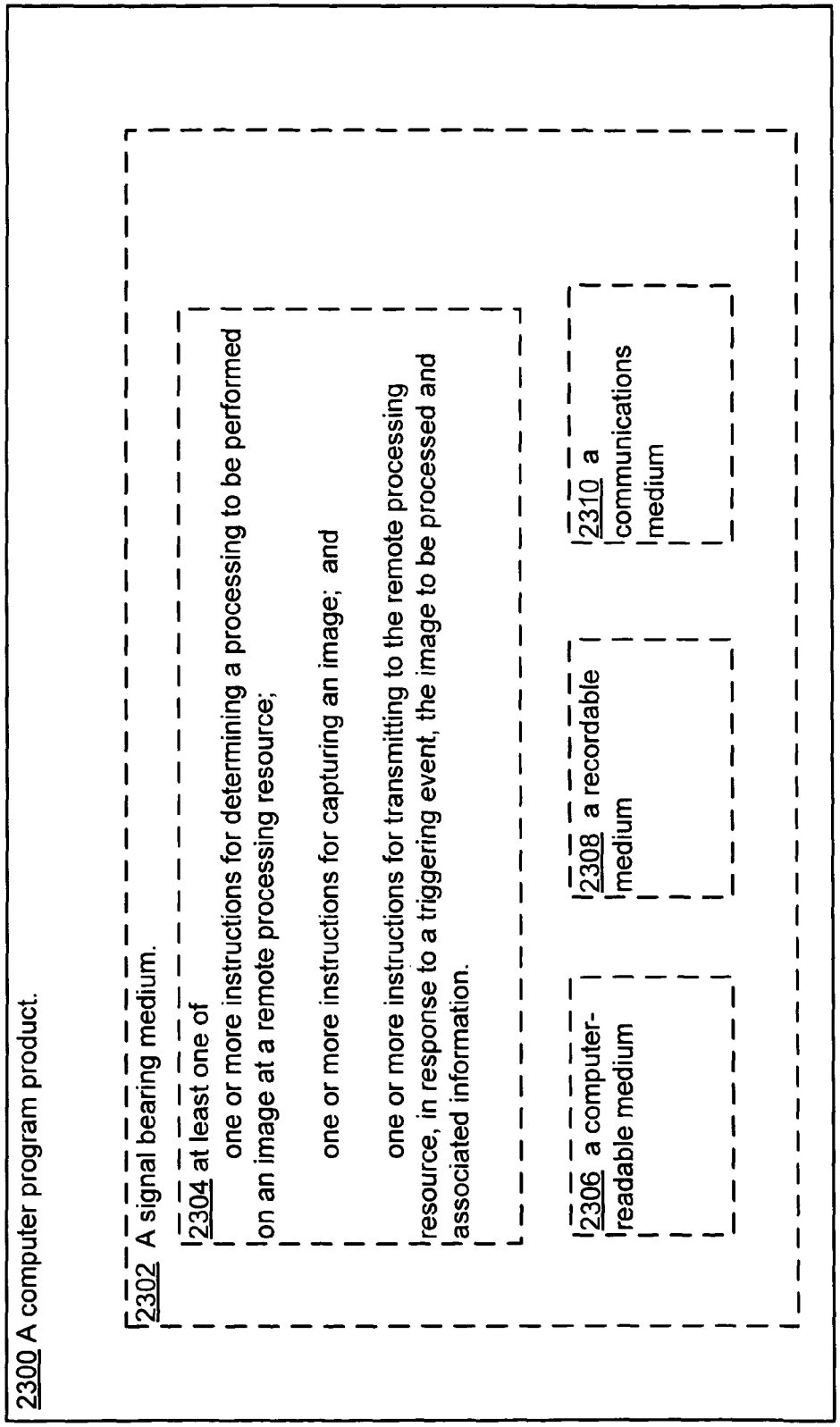
FIG. 23 illustrates a partial view of an exemplary computer program product 2300.

FIG. 23 illustrates a partial view of an exemplary computer program product 2300 that includes a computer program 2304 for executing a computer process on a computing device. An embodiment of the exemplary computer program product 2300 is provided using a signal bearing medium 2302, and may include at least one or more instructions for determining a processing to be performed on an image at a remote processing resource, one or more instructions for capturing an image, and one or more instructions for transmitting to the remote processing resource, in response to a triggering event, the image to be processed and associated information.

The one or more instructions may be, for example, computer executable and/or logic-implemented instructions. In one implementation, the signal-bearing medium 2302 may include a computer-readable medium 2306. In one implementation, the signal-bearing medium 2302 may include a recordable medium 2308. In one implementation, the signal-bearing medium 2302 may include a communications medium 2310.

FIG. 24 illustrates an exemplary system 2400 in which embodiments may be implemented. The system 2400 includes a computing system environment. The system 2400 also includes a computing device 2402. In an example embodiment, the computing device 2402 may be a device 2404, which may be an image capture device, a camera, or an image capture device with wireless communications capability, etc.

The computing device 2402 also includes computer executable instructions 2410 that when executed on the computing device 2402 causes the computing device 2402 to determine a processing to be performed on an image at a remote processing resource, capture an image, and transmit to the remote processing resource, in response to a triggering event, the image to be processed and associated information.

In addition, computer executable instructions 2410 may include one or more additional computer executable instructions, including instructions 2412 and 2414. Computer executable instruction 2412 when executed on the computing device 2402 causes the computing device 2402 to receive status information indicating a status of the processing of the image. Computer executable instruction 2414 when executed on the computing device 2402 causes the computing device 2402 to receive the image after it has been processed at the remote processing resource.

Figure 25:
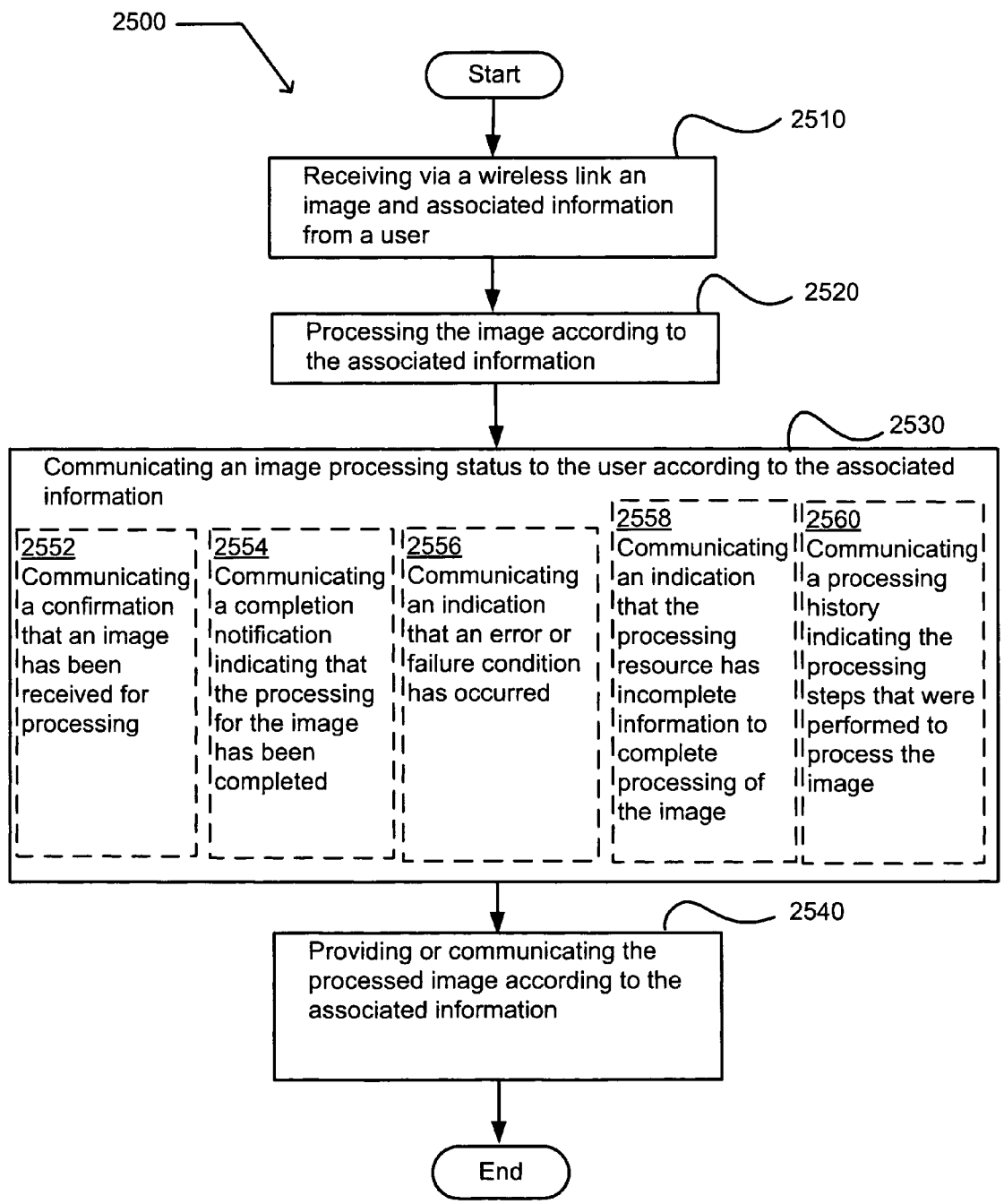
FIG. 25 illustrates an operational flow 2500 representing example operations by which an image may be processed and provided to a user 101.

FIG. 25 illustrates an operational flow 2500 representing example operations by which an image may be processed and provided to a user 101. At operation 2510, an image and associated information is received from a user via a wireless link. For example, the associated information may include a variety of information, such as information that may be useful in processing the image. For example, the associated information may include an indication of the processing to be performed, an identity of the user, an indication of how or where status information should be communicated to the user, an indication of where the processed image should be provided to the user or image capture device, etc. At operation 2510, the image and associated information may be received at a remote processing resource for processing (e.g., where the image was transmitted in part over a wireless link).

At operation 2520, the received image is processed according to the associated information. The associated information may provide processing instructions. Alternatively, processing instructions may be provided through a prior or other communication between the user 101 or image capture device 102 and the remote processing resource 106. Thus, the image may be transmitted, and the remote processing resource 106 may process the image based on instructions provided in the associated information or based on pre-arranged instructions not necessarily communicated with the image, according to an example embodiment.

At operation 2530, an image processing status is communicated to the user according to the associated information. For example, remote processing resource 106 may send a message to the image capture device 102 or user 101 indicating that processing of an image is complete. At operation 2540, the processed image is provided or communicated according to the associated information. For example, based on the associated information or other instructions, the processed image may be communicated back to the image capture device, or may be stored on a web site or other storage resource that may be accessed by the user.

FIG. 25 also illustrates an example embodiment wherein the communicating an image processing status to the user (operation 2530) may include at least one additional operation. Additional operations may include operation 2552, operation 2554, operation 2556, operation 2558 and operation 2560. At operation 2552, a confirmation is communicated that an image has been received for processing. At operation 2554, a completion notification is communicated indicating that the processing for the image has been completed. At operation 2556, an indication of an error or failure condition is communicated. At operation 2558, an indication is communicated that the processing resource has incomplete information to complete processing of the image. At operation 2560, a processing history is communicated indicating the processing steps that were performed to process the image.

Figure 26:
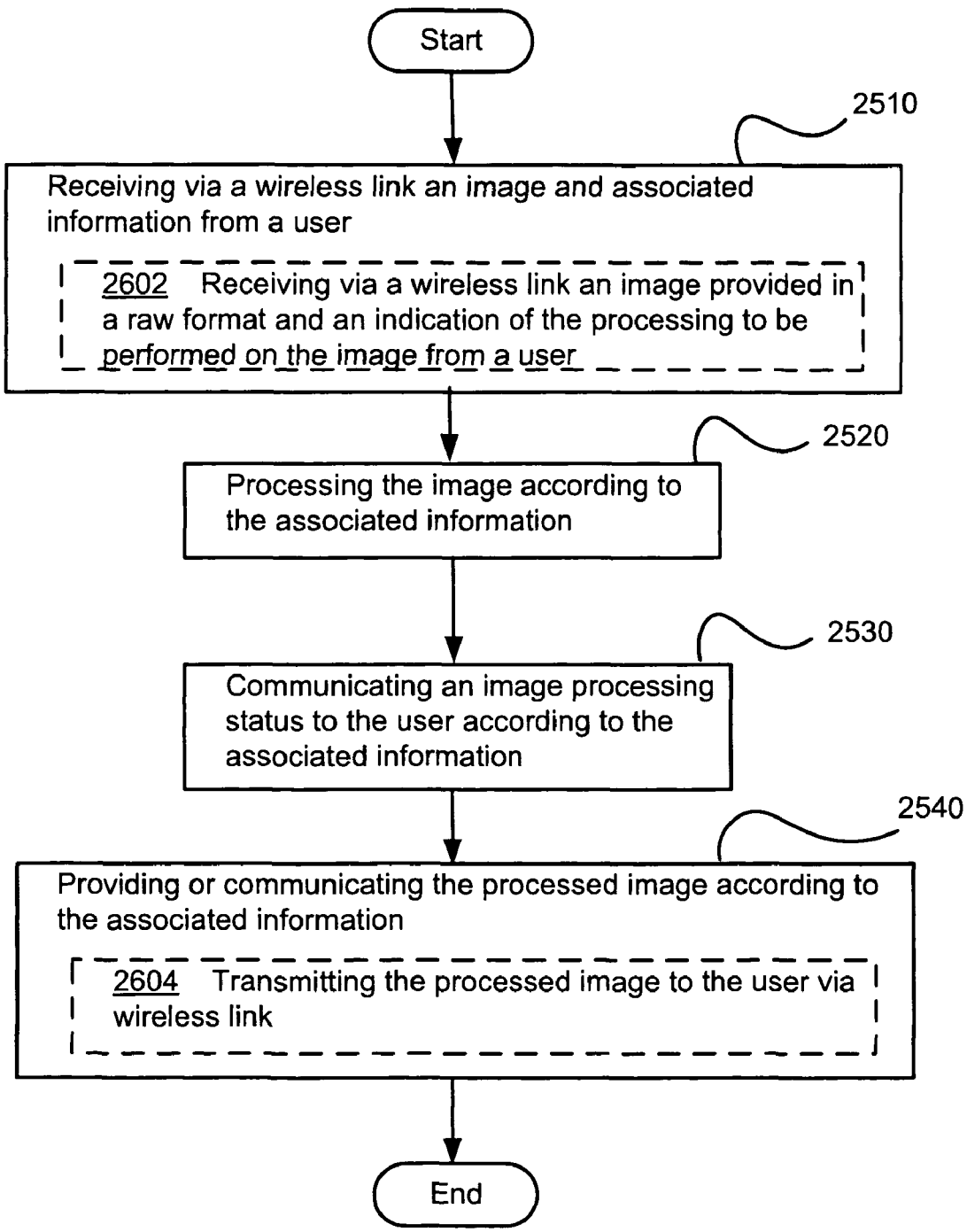
FIG. 26 illustrates an alternative embodiment of the example operational flow 2500 of FIG. 25.

FIG. 26 illustrates an alternative embodiment of the example operational flow 2500 of FIG. 25. FIG. 26 illustrates an example embodiment where the receiving operation 2510 may include at least one additional operation and the providing operation 2540 may include at least one additional operation. Additional operations may include operation 2602 and operation 2604. At operation 2602, an image is received from a user via a wireless link that is provided in a raw format and an indication of the processing to be performed on the image. A raw format may, for example, include uncompressed or substantially uncompressed image or an image that is substantially unprocessed. The raw format may provide more information for image processing than some types of compressed or processed image formats. At operation 2604, the processed image is transmitted to the user via a wireless link.

Figure 27:
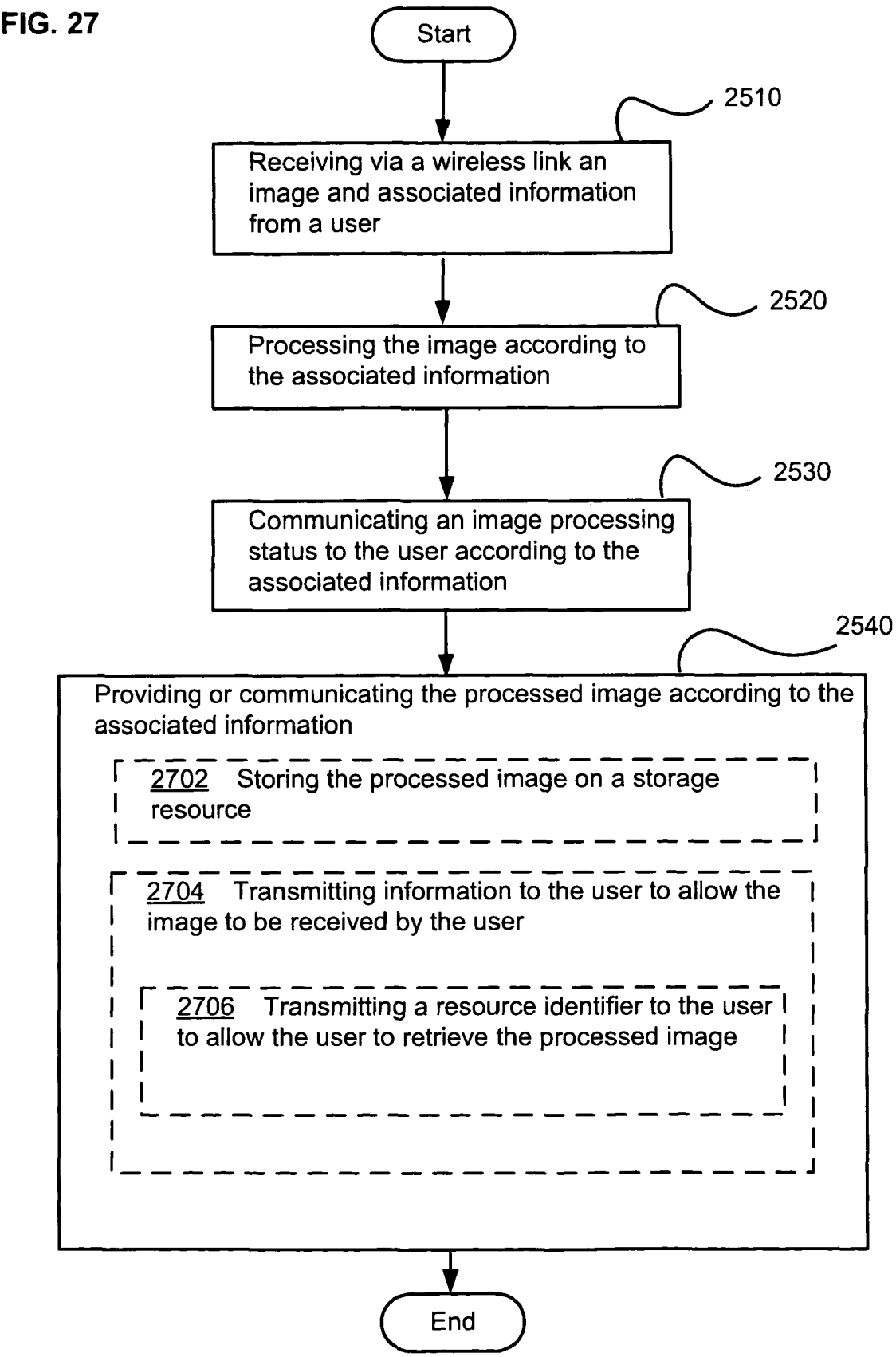
FIG. 27 illustrates an alternative embodiment of the example operational flow 2500 of FIG. 25.

FIG. 27 illustrates an alternative embodiment of the example operational flow 2500 of FIG. 25. FIG. 27 illustrates an example embodiment where the providing operation 2540 may include at least one additional operation. Additional operations may include operation 2702, operation 2704 and operation 2706. At operation 2702, the processed image is stored on a storage resource, such as a web site, a server, etc.

At operation 2704, information is transmitted to the user to allow the user to receive the image. Operation 2706 may be performed in addition to or in association with transmitting operation 2704. At operation 2706, a resource identifier is transmitted to the user to allow the user to retrieve the processed image. For example, a link or URL (Universal Resource Locator) may be transmitted to the user identifying where the processed image is stored to allow the user to obtain or retrieve the processed image.

FIG. 28 illustrates a partial view of an exemplary computer program product 2800 that includes a computer program 2804 for executing a computer process on a computing device. An embodiment of the exemplary computer program product 2800 is provided using a signal bearing medium 2802, and may include at least one or more instructions for receiving via a wireless link an image and associated information from a user, one or more instructions for processing the image according to the associated information, one or more instructions for communicating an image processing status to the user according to the associated information, and one or more instructions for providing or communicating the processed image according to the associated information.

The one or more instructions may be, for example, computer executable and/or logic-implemented instructions. In one implementation, the signal-bearing medium 2802 may include a computer-readable medium 2806. In one implementation, the signal-bearing medium 2802 may include a recordable medium 2808. In one implementation, the signal-bearing medium 2802 may include a communications medium 2810.

Figure 29:
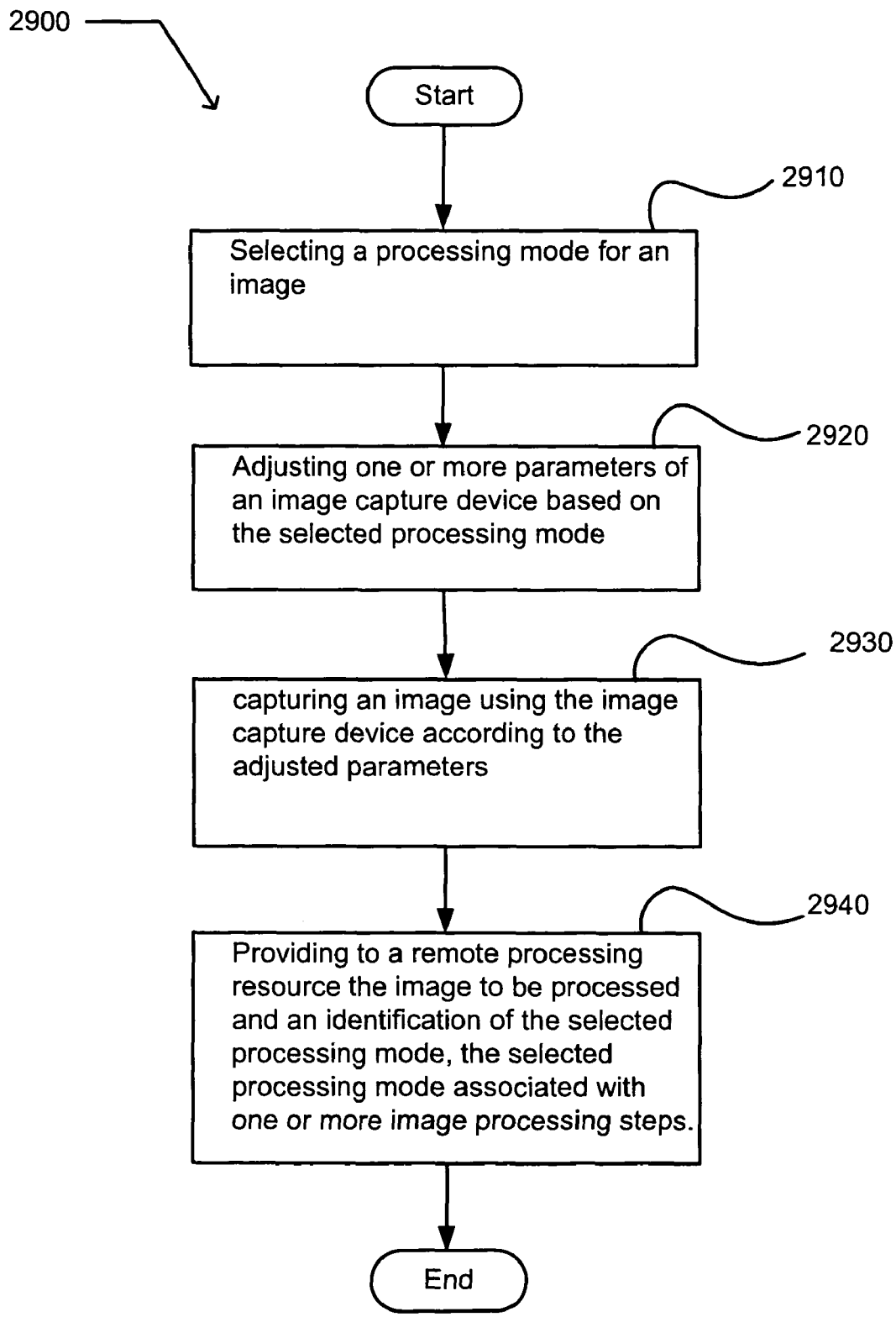
FIG. 29 illustrates an operational flow 2900 representing example operations by which an image may be captured and remotely processed.

FIG. 29 illustrates an operational flow 2900 representing example operations by which an image may be captured and remotely processed. At operation 2910, a processing mode is selected for an image (or images). The processing mode (or processing program) may include, for example, a portrait mode, an action mode, a night mode, a close-up mode, etc.

At operation 2920, one or more parameters of the image capture device are adjusted based on the selected processing mode. For example, each processing mode may include a set of image capture device parameters to allow the image to be captured according to that mode. For example, each processing mode may specify an associated setting for a shutter, lens, flash, etc., of an image capture device.

At operation 2930, an image is captured using the image capture device according to the adjusted parameters. For example, a user 101 may select "action" mode, which may cause a shutter speed to be adjusted accordingly. The action image may then be captured using this action mode shutter speed, for example.

At operation 2940, the image to be processed and an identification of the selected processing mode are provided to a remote processing resource. The selected processing mode is associated with one or more image processing steps. In this manner, a user may select a processing mode (or program) on an image capture device, which results in both local parameter adjustments associated with the mode for the image capture device and identification or selection of image processing steps associated with the selected mode for processing the image at a remote processing resource.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. In so far as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While certain features of the described implementations have been illustrated as disclosed herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   determining a processing to be performed on an image at a remote processing resource;
   capturing an image by an image capture device;
   transmitting to the remote processing resource from the image capture device, in response to a triggering event, the image to be processed and associated information, wherein the transmitting to the remote processing resource, in response to the triggering event, includes:
      automatically selecting and transmitting when an amount of stored information including the captured image reaches a predetermined level,
      or when an amount or number of stored images reaches a predetermined level;
   transmitting to the remote processing resource from the image capture device an indication of where an image should be transmitted or stored after processing, wherein the indication of where the image should be transmitted or stored after processing includes selection of one or more of:
      an address or identifier identifying a device,
      a network address,
      a network address of a user device,
      a network address of a wireless user device,
      a network address of a storage resource,
      a link to a resource or device,
      a Universal Resource Locator (URL),
      a telephone number associated with a user wireless device, or
      an electronic mail or e-mail address; and
   receiving, at the image captured device, status information relating to a status of processing of the image, wherein the receiving comprises selectively receiving one or more of:
      an indication that an error or failure condition has occurred;
      an indication that the processing resource has incomplete information to complete processing of the image; and
      a processing history indicating the processing steps that were performed to process the image.

2. The method of claim 1 wherein the determining a processing further comprises:
   determining a remote processing resource to perform the processing.

3. The method of claim 1 wherein the transmitting comprises:
   at least one of
   transmitting an indication of the processing to be performed on the image at the remote processing resource,
   transmitting a specific image processing instruction,
   transmitting instructions related to a requested image processing result for an image,
   transmitting an instruction to use one of a plurality of image processing programs to process the image,
   transmitting an indication of where an image should be transmitted or stored after processing,
   transmitting an indication of how to provide or communicate status information relating to the status of the processing of the image, or
   transmitting an indication of the one or more types of status information that should be provided or communicated relating to the status of the processing of the image.

4. The method of claim 1 wherein the transmitting comprises:
   at least one of
   transmitting an instruction to use a portrait image processing program to process the image,
   transmitting an instruction to use an action image processing program to process the image,
   transmitting an instruction to use a night or low-light image processing program to process the image,
   transmitting an instruction to use a night portrait image processing program to process the image,
   transmitting an instruction to use a landscape image processing program to process the image, or
   transmitting an instruction to use a close-up image processing program to process the image.

5. The method of claim 1 wherein the transmitting comprises:
   transmitting an indication of how to provide or communicate status information relating to the status of the processing of the image including at least one of
   an address or identifier identifying a device,
   a network address,
   a network address of a user device,
   a network address of a wireless user device,
   a network address of a storage resource,
   a link to a resource or device,
   a Universal Resource Locator (URL),
   a telephone number associated with a user wireless device, or
   an electronic mail or e-mail address.

6. The method of claim 1 wherein the transmitting comprises:
   at least one of
   transmitting an indication that a confirmation should be provided or communicated confirming that an image has been received for processing,
   transmitting an indication that a completion notification should be provided or communicated indicating when the processing for the image is completed,
   transmitting an indication that error information should be provided or communicated indicating one or more error conditions,
   transmitting an indication that status information should be provided or communicated indicating that the processing resource has incomplete information to complete processing of the image, or
   transmitting an indication that status information should be provided or communicated indicating that a processing history should be provided or communicated indicating the processing steps that were performed to process the image.

7. The method of claim 1 wherein the determining a processing to be performed comprises:
determining a portion of an image to be substituted with or replaced by another image or image portion.

8. The method of claim 1 wherein the transmitting comprises:
at least one of
transmitting in response to capturing the image,
transmitting in response to actuating a shutter, or
transmitting in response to activating an image capture control.

9. The method of claim 1 further comprising:
receiving status information at a wireless user device relating to the status of the processing of the image; and
providing a indication to a user of the status information.

10. The method of claim 1 wherein the transmitting comprises:
transmitting via wireless link to the remote processing resource, in response to a triggering event, the image to be processed and associated information.

11. The method of claim 1 further comprising:
receiving status information at a wireless user device confirming that an image has been received at the remote processing resource for processing; and
providing an audio or visual indication to a user of the status information.

12. The method of claim 1 further comprising:
receiving status information at a wireless user device confirming that processing of an image has been completed; and
providing an audio or visual indication to a user of the status information.

13. The method of claim 1 further comprising:
receiving status information at a wireless user device indicating that an error condition has occurred; and
providing an audio or visual indication to a user of the status information.

14. The method of claim 1 further comprising:
receiving information to allow the captured image to be received after it has been processed at the remote processing resource.

15. The method of claim 1 further comprising:
receiving information via a wireless link to allow the image to be received after it has been processed at the remote processing resource.

16. The method of claim 1 further comprising:
receiving the image after it has been processed at the remote processing resource.

17. The method of claim 1 further comprising:
receiving the image via a wireless link after it has been processed at the remote processing resource.

18. The method of claim 1 further comprising:
configuring the image capture device to provide for remote image processing of the captured image.

19. The method of claim 18 wherein said configuring comprises:
configuring, before said capturing, the image capture device capturing the image to provide for remote image processing of the captured image.

20. The method of claim 18 wherein said configuring comprises:
configuring, after said capturing, the image capture device capturing the image to provide for remote image processing of the captured image.

21. The method of claim 18 wherein said configuring comprises:
at least one of
identifying a user of the device,
providing user payment information,
specifying how or where the processed image may be provided to the user or the image capture device,
providing at least some image processing instructions, or
identifying an image processing program to be used in processing an image.

22. A method comprising:
automatically receiving, at a remote processing resource via a wireless link from an image capture device, a raw image format, associated information and an indication of a processing to be performed on the raw image when an amount of stored information including image data in the image capture device reaches a predetermined level, or when an amount or number of stored images in the image capture device reaches a predetermined level;
processing, by the remote processing resource, the raw image according to the associated information;
communicating an image processing status to the image capture device according to the associated information, wherein the communicating the image processing status includes:
selectively communicating to the image capture device an indication that an error or failure condition has occurred, or an indication that the remote processing resource has incomplete information to complete processing of the raw image; and
communicating to the image capture device, via a processor, the processed image according to the associated information, wherein the communicating to the image capture device, via the processor, the processed image according to the associated information including communicating a processing history indicating processing steps that were performed to process the raw image.

23. The method of claim 22 wherein the communicating, via a processor, the processed image according to the associated information comprises:
transmitting a resource identifier to the user to allow the user to retrieve the processed image.

24. A method comprising:
determining a processing to be performed on an image at a remote processing resource;
capturing an image by an image capture device;
transmitting to the remote processing resource from the image capture device, in response to a triggering event, the image to be processed and associated information, wherein the transmitting to the remote processing resource, in response to the triggering event, includes:
automatically selecting and transmitting when an amount of stored information including the captured image reaches a predetermined level, or when an amount or number of stored images reaches a predetermined level;
transmitting to the remote processing resource from the image capture device an indication of how to provide or communicate status information relating to the status of the processing of the image, wherein the indication of how to provide or communicate status information relating to the status of the processing of the image includes selection of one or more of:
an address or identifier identifying a device,
a network address,
a network address of a user device,
a network address of a wireless user device, a network address of a storage resource,
a link to a resource or device,
a Universal Resource Locator (URL),
a telephone number associated with a user wireless device, or
an electronic mail or e-mail address; and
receiving, at the image captured device, status information relating to a status of processing of the image, wherein the receiving comprises selectively receiving one or more of:

an indication that an error or failure condition has occurred;
an indication that the processing resource has incomplete information to complete processing of the image; and
a processing history indicating the processing steps that were performed to process the image.

* * * * *

UNITED STATES PATENT AND TRADEMARK OFFICE
CERTIFICATE OF CORRECTION

PATENT NO.      : 8,237,801 B2
APPLICATION NO. : 11/198879
DATED           : August 7, 2012
INVENTOR(S)     : Royce A. Levien et al.

It is certified that error appears in the above-identified patent and that said Letters Patent is hereby corrected as shown below:

On the Title Page "(73) Assignee: The Innovation Science Fund I, LLC, Bellevue, WA (US)" should read --(73) Assignee: The Invention Science Fund I, LLC, Bellevue, WA(US)--

Signed and Sealed this
Twenty-third Day of April, 2013

Teresa Stanek Rea
*Acting Director of the United States Patent and Trademark Office*